United States Patent
Lee et al.

(10) Patent No.: US 11,440,189 B2
(45) Date of Patent: Sep. 13, 2022

(54) METHOD AND ROBOT DEVICE FOR SHARING OBJECT DATA

(71) Applicant: SAMSUNG ELECTRONICS CO., LTD., Suwon-si (KR)

(72) Inventors: Junghwan Lee, Suwon-si (KR); Daehun Kim, Suwon-si (KR); Hyunseok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 379 days.

(21) Appl. No.: 16/710,240

(22) Filed: Dec. 11, 2019

(65) Prior Publication Data

US 2020/0189104 A1  Jun. 18, 2020

(30) Foreign Application Priority Data

Dec. 12, 2018  (KR) .......................... 10-2018-0160335

(51) Int. Cl.
*B25J 9/16* (2006.01)
*B25J 13/00* (2006.01)

(52) U.S. Cl.
CPC ........... *B25J 9/1666* (2013.01); *B25J 13/006* (2013.01)

(58) Field of Classification Search
CPC ...... B25J 9/1666; B25J 13/006; B25J 11/008; B25J 9/1679; B25J 9/1602; B25J 9/1628; B25J 9/1664; B25J 9/1669; B25J 13/08; G05B 2219/40543; G05B 2219/40563
See application file for complete search history.

(56) References Cited

U.S. PATENT DOCUMENTS

| 7,765,028 B2 | 7/2010 | Orita |
| 8,478,901 B1 | 7/2013 | Poursohi et al. |
| 8,755,936 B2 | 6/2014 | Friedman et al. |
| 10,730,181 B1 * | 8/2020 | Rajkumar ............. B25J 9/1653 |

(Continued)

FOREIGN PATENT DOCUMENTS

| JP | 2005-279828 | 10/2005 |
| JP | 4377744 | 9/2009 |

(Continued)

OTHER PUBLICATIONS

International Search Report and Written Opinion dated Mar. 17, 2020 in counterpart International Application No. PCT/KR2019/017474.

(Continued)

*Primary Examiner* — Robert T Nguyen
(74) *Attorney, Agent, or Firm* — Nixon & Vanderhye, P.C.

(57) ABSTRACT

Provided are a method and robot device for sharing object data. The method, performed by a robot device, of sharing object data includes: obtaining sensing data related to objects in a certain space; classifying the obtained sensing data into a plurality of pieces of object data based on properties of the objects; selecting another robot device from among at least one other robot device; selecting object data to be provided to the selected robot device from among the classified plurality of pieces of object data; and transmitting the selected object data to the selected robot device, wherein the classifying of the sensing data into a plurality of pieces object data includes generating a plurality of data layers including the classified plurality of pieces of object data.

16 Claims, 24 Drawing Sheets

(56) References Cited

U.S. PATENT DOCUMENTS

| | | | |
|---|---|---|---|
| 2008/0243305 A1 | 10/2008 | Lee et al. | |
| 2018/0101548 A1 | 4/2018 | Jones et al. | |
| 2020/0334887 A1* | 10/2020 | Salfity | G06V 30/274 |
| 2021/0161351 A1* | 6/2021 | Lee | A47L 11/4061 |
| 2021/0370511 A1* | 12/2021 | Hong | A47L 11/4061 |
| 2022/0147050 A1* | 5/2022 | Cheng | G06V 20/10 |

FOREIGN PATENT DOCUMENTS

| | | |
|---|---|---|
| JP | 2011-245577 | 12/2011 |
| KR | 10-2008-0089148 | 10/2008 |
| KR | 10-1180761 | 9/2012 |
| KR | 10-2014-0087486 | 7/2014 |
| KR | 10-2015-0075639 | 7/2015 |
| KR | 10-2017-0014514 | 2/2017 |
| KR | 10-1863191 | 5/2018 |

OTHER PUBLICATIONS

Notice of Final Rejection dated Feb. 17, 2020 in counterpart Korean Application No. 10-2018-160335.

* cited by examiner

FIG. 4B
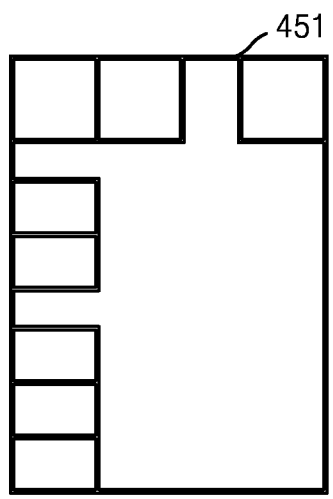
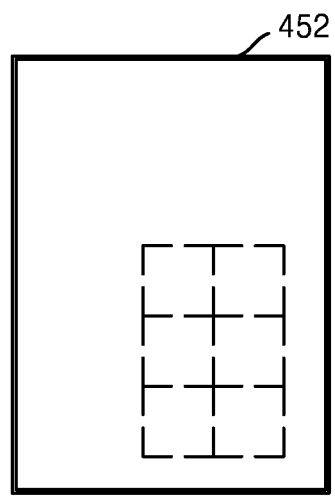
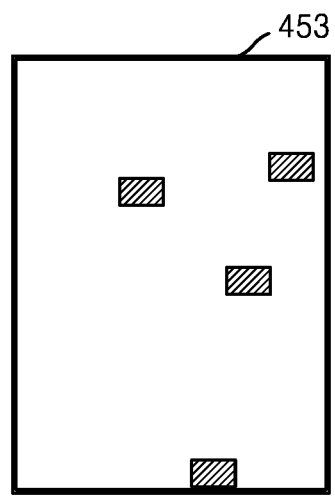
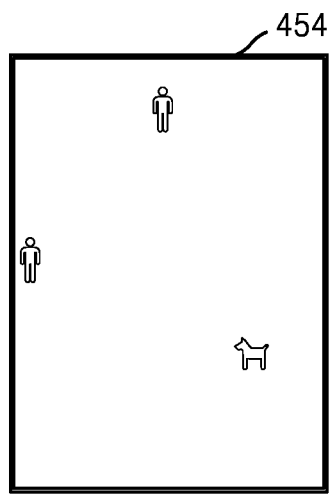
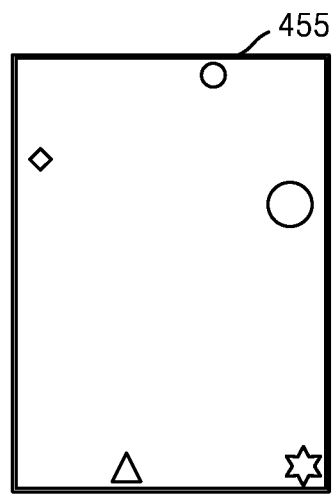
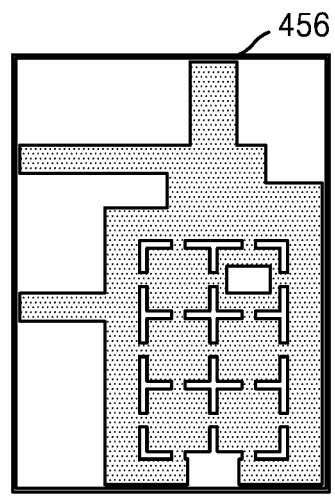

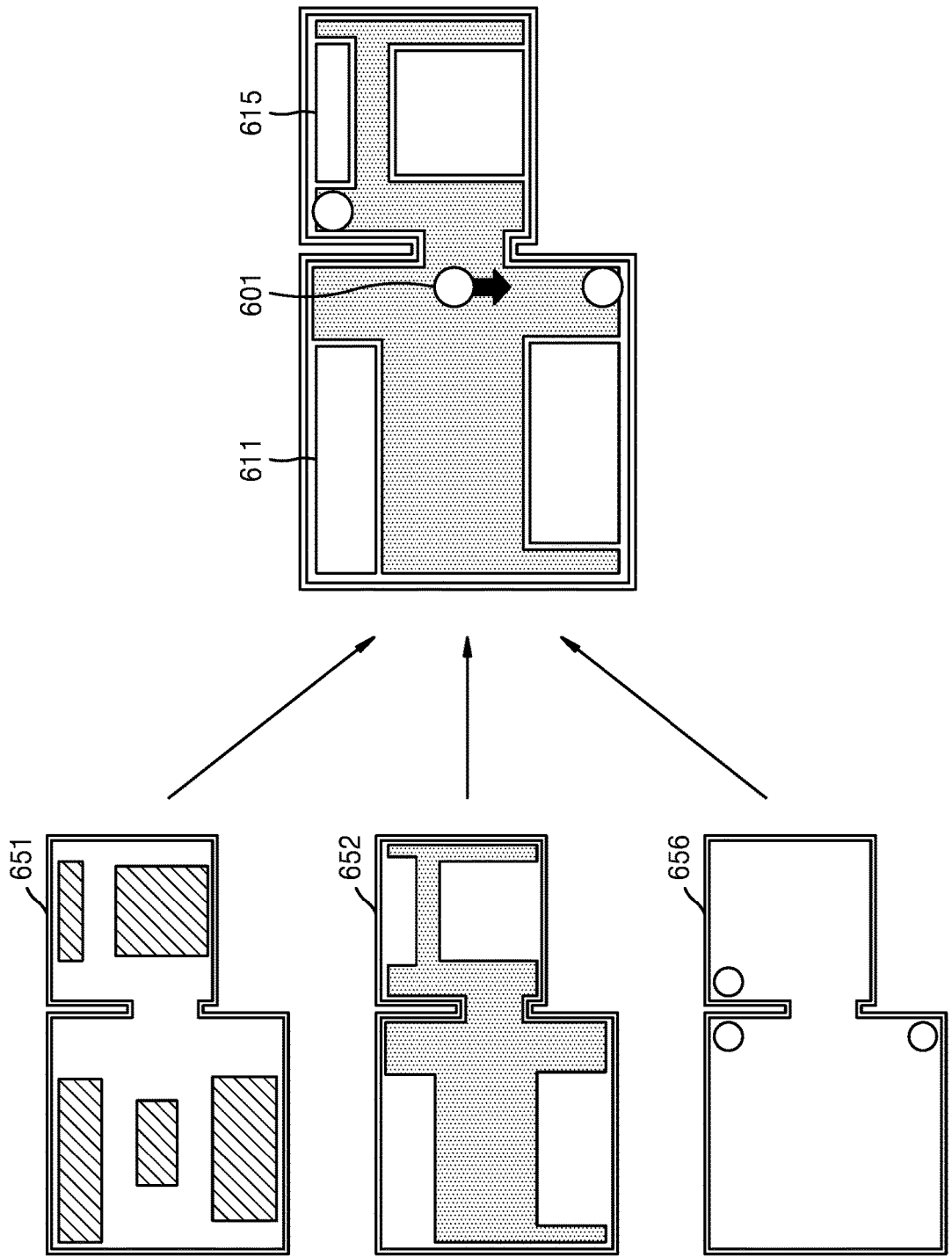

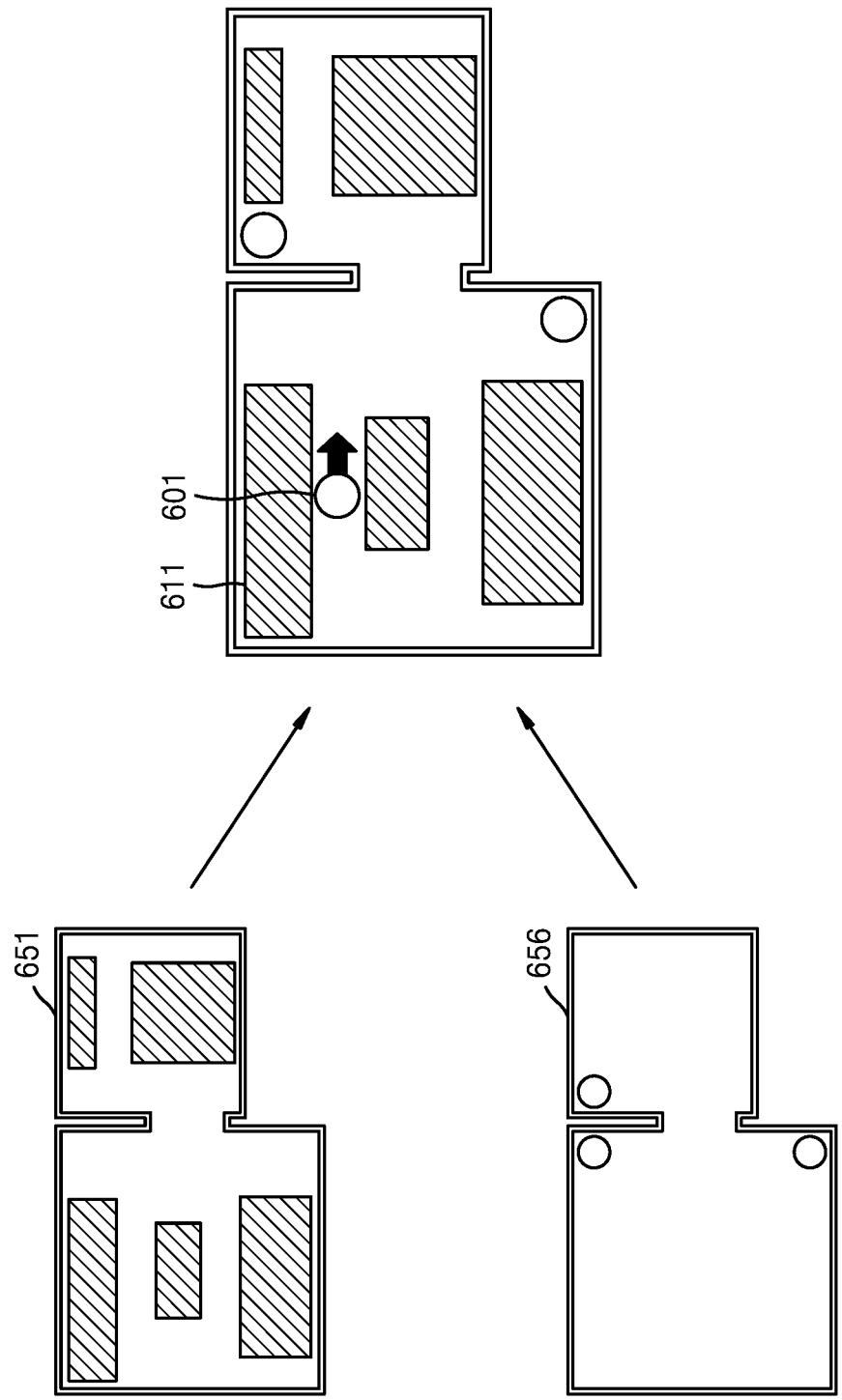

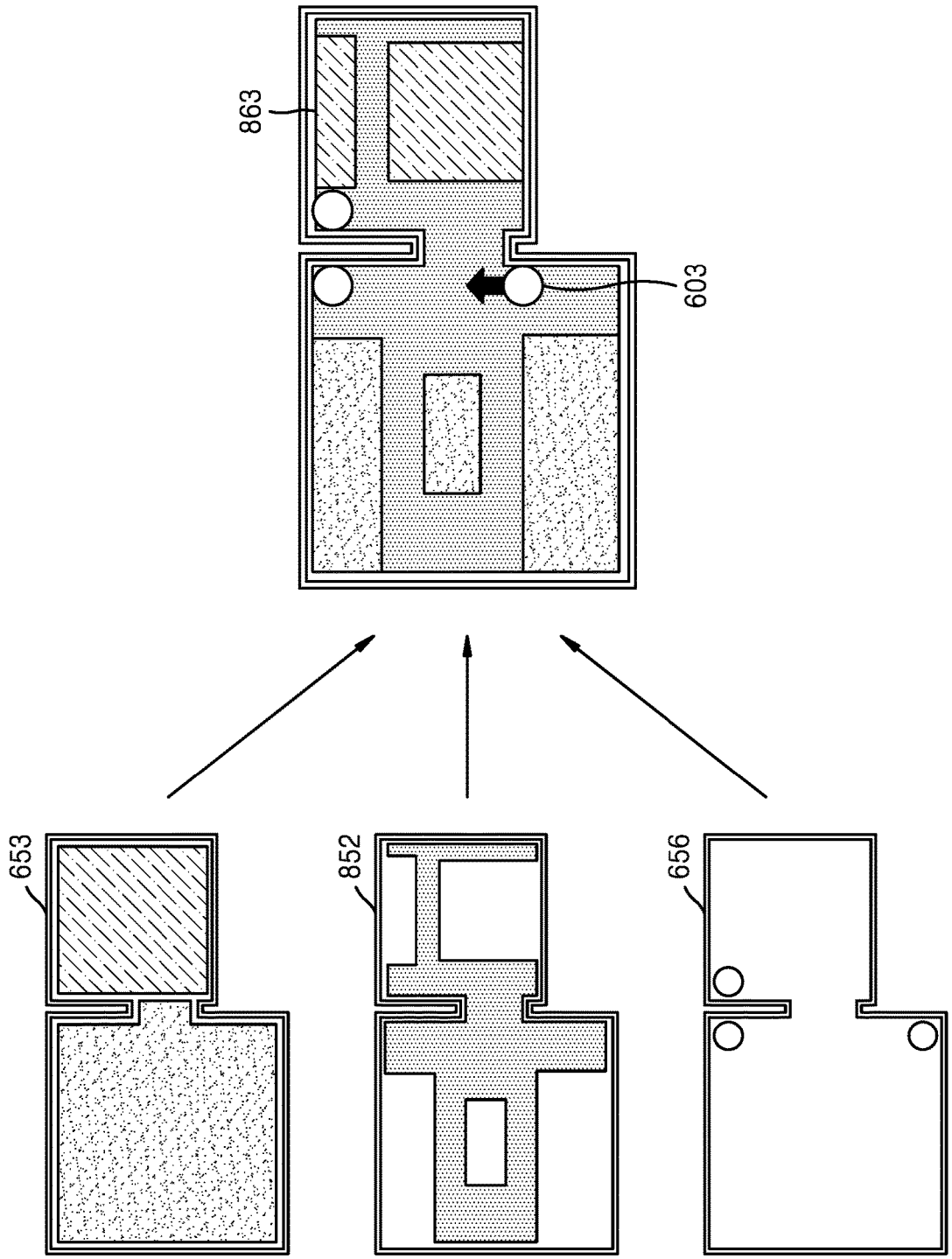

FIG. 8B
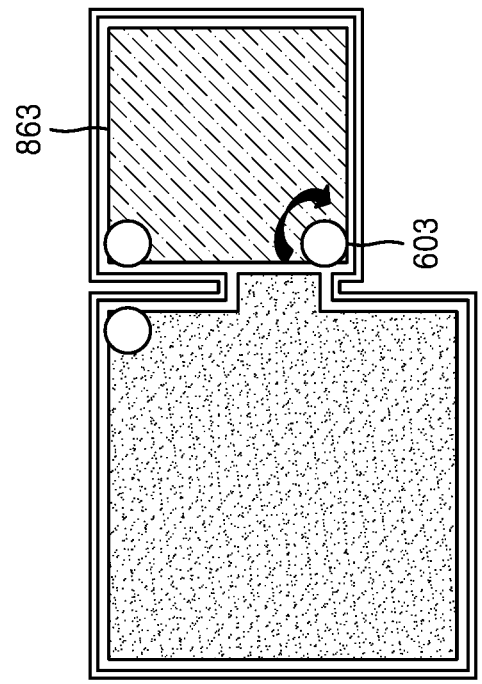
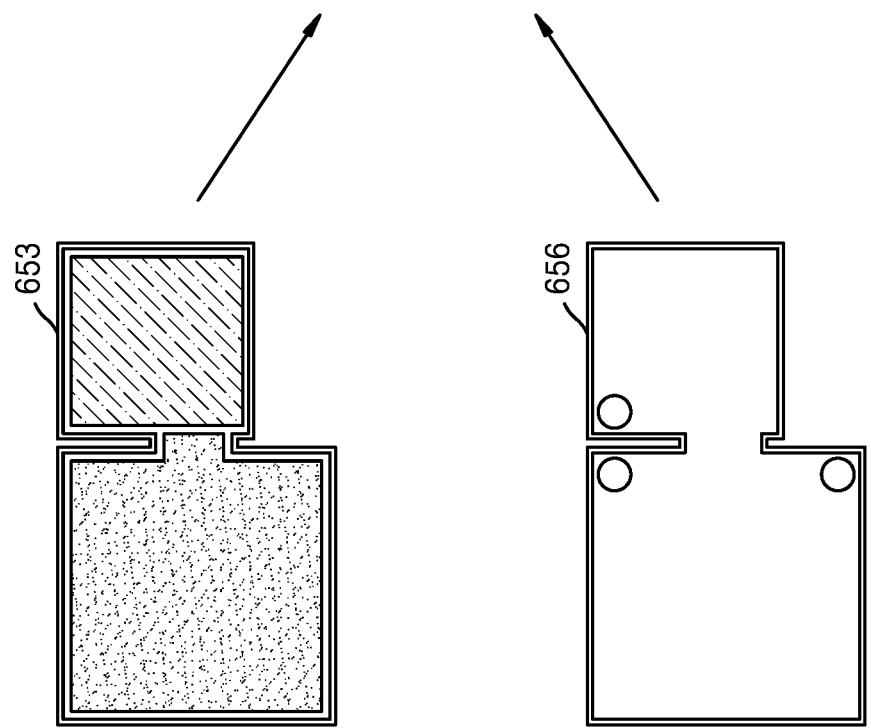

METHOD AND ROBOT DEVICE FOR SHARING OBJECT DATA

CROSS-REFERENCE TO RELATED APPLICATION

This application is based on and claims priority under 35 U.S.C. § 119 to Korean Patent Application No. 10-2018-0160335, filed on Dec. 12, 2018, in the Korean Intellectual Property Office, the disclosure of which is incorporated by reference herein in its entirety.

BACKGROUND

1. Field

The disclosure relates to a robot device for sharing object data about objects in a certain space and an object data sharing method.

2. Description of Related Art

A robot device needs to efficiently execute functions in a certain space in various operating modes and environments, and there is a need to increase the function execution efficiency through cooperation with other robot devices. Accordingly, technology for efficiently sharing data among a plurality of robot devices existing in the same space is necessary.

SUMMARY

Embodiments of the disclosure provide a robot device capable of classifying sensing data about objects in a certain space into a plurality of pieces of object data based on types of the objects and selectively sharing the classified object data with other robot devices, and an object data sharing method.

Embodiments of the disclosure also provide a robot device capable of selecting another robot device to share sensing data, based on a target area determined based on a user's voice command, and an object data sharing method.

Additional aspects will be set forth in part in the description which follows and, in part, will be apparent from the description.

According to an example embodiment of the disclosure, a method, performed by a robot device, of sharing object data, includes: obtaining sensing data related to objects in a certain space; classifying the obtained sensing data into a plurality of pieces of object data based on properties of the objects; selecting another robot device from among at least one other robot device; selecting object data to be provided to the selected robot device from among the classified plurality of pieces of object data; and transmitting the selected object data to the selected robot device, wherein the classifying of the sensing data into the plurality of pieces object data includes generating a plurality of data layers including the classified plurality of pieces of object data.

According to another example embodiment of the disclosure, a robot device includes: a memory storing at least one instruction; and a processor configured to execute the at least one instruction to control the robot device, wherein the processor is further configured to execute the at least one instruction to control the robot device to: obtain sensing data related to objects in a certain space, classify the obtained sensing data into a plurality of pieces of object data based on properties of the objects, generate a plurality of data layers including the classified plurality of pieces of object data, select another robot device from among at least one other robot device, select object data to be provided to the selected robot device from among the classified plurality of pieces of object data, and transmit the selected object data to the selected robot device.

According to another example embodiment of the disclosure, a computer program device includes a non-transitory computer-readable recording medium having recorded thereon a program for executing the above-described method on a computer

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 4B is a diagram illustrating examples of data layers including a plurality of pieces of object data generated by a robot device, according to various embodiments of the disclosure;

FIG. 7A is a diagram illustrating an example in which an image layer is displayed on a display during movement of a robot device, according to various embodiments of the disclosure;

FIG. 7B is a diagram illustrating an example in which an image layer is displayed on a display during execution of a function by a robot device, according to various embodiments of the disclosure;

FIG. 8A is a diagram illustrating an example in which an image layer is displayed on a display during movement of a robot device, according to various embodiments of the disclosure;

FIG. 8B is a diagram illustrating an example in which an image layer is displayed on a display during execution of a function by a robot device, according to various embodiments of the disclosure;

DETAILED DESCRIPTION

Figure 1:
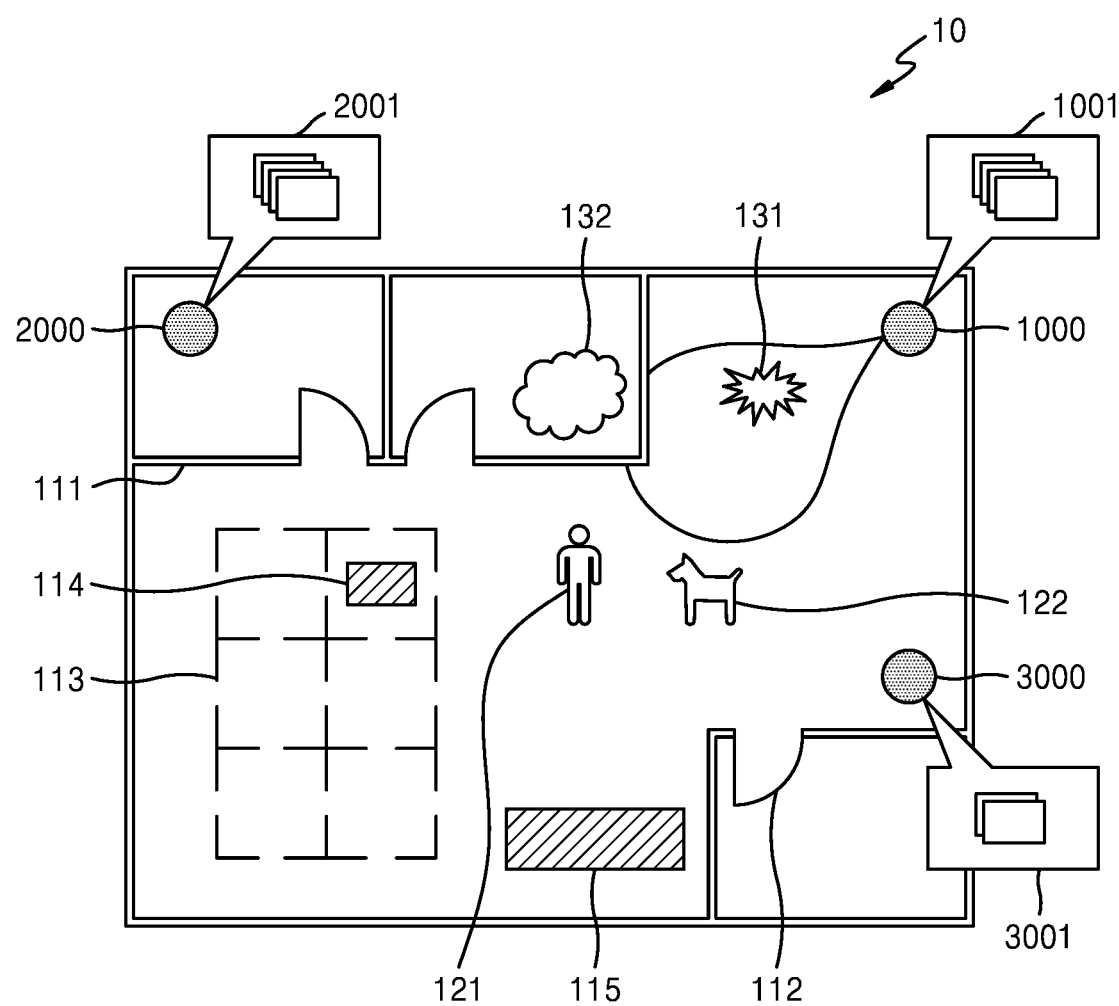
FIG. 1 is a diagram illustrating an example of a robot device in a certain space according to various embodiments of the disclosure.

Hereinafter, various example embodiments of the disclosure will be described in greater detail with reference to the accompanying drawings, in which various example embodiments of the disclosure are illustrated and described. This disclosure may, however, be embodied in many different forms and should not be understood as being limited to the example embodiments of the disclosure set forth herein. Also, elements not related to description may be omitted in the drawings for clear description of the disclosure, and like reference numerals in the drawings may refer to like elements throughout the disclosure.

Throughout the disclosure, the expression "at least one of a, b or c" indicates only a, only b, only c, both a and b, both a and c, both b and c, all of a, b, and c, or variations thereof.

In the present disclosure, it will also be understood that when an element is referred to as being "connected to" another element, it can be directly connected to the other element, or it can be electrically connected to the other element and intervening elements may be present. It will also be understood that when a component "includes" an element, unless there is another contrary description thereto, it should be understood that the component does not exclude another element but may further include another element.

Hereinafter, the disclosure will be described in greater detail with reference to the attached drawings.

FIG. 1 is a diagram illustrating an example of a robot device in a certain space according to various embodiments of the disclosure.

Referring to FIG. 1, a first robot device 1000 according to various embodiments of the disclosure may execute a function while moving in a certain space 10. The certain space may, for example, be a space that requires management through execution of functions of a robot device, such as home or an office.

A function of the first robot device 1000 may correspond to, for example, a function of directly removing a contaminant in the certain space 10 or spraying certain chemical, but is not limited thereto. The function of the first robot device 1000 may correspond to, for example, a function of transmitting a command to a second robot device 2000 and a third robot device 3000 in the certain space 10 to remove a contaminant in the certain space 10 or spray certain chemical.

The first robot device 1000 may obtain sensing data related to objects in the certain space 10. The space occupied by the objects in the certain space 10 may refer, for example, to where the first robot device 1000 is unable to move, and the objects may correspond to obstacles.

The objects in the certain space 10 may be, for example, a fixed wall 111, a door 112, a movable wall 113, a furniture 115, an electronic device 114, a person 121, an animal 122, the second robot device 2000, and the third robot device 3000. The first robot device 1000 may obtain sensing data about positions of the fixed wall 111, the door 112, the movable wall 113, the furniture 115, the electronic device 114, the person 121, the animal 122, the second robot device 2000, and the third robot device 3000.

The first robot device 1000 may classify the obtained sensing data into a plurality of pieces of object data based on properties of the objects in the certain space 10.

For example, the first robot device 1000 may classify the sensing data about the fixed wall 111, the door 112, the movable wall 113, the furniture 115, the electronic device 114, the person 121, the animal 122, the second robot device 2000, and the third robot device 3000, into object data about immovable objects (e.g., 111) and movable objects (e.g., 112, 113, 115, 114, 121, 122, 2000, 3000).

For example, the first robot device 1000 may classify the sensing data about the fixed wall 111, the door 112, the movable wall 113, the furniture 115, the electronic device 114, the person 121, the animal 122, the second robot device 2000, and the third robot device 3000, into object data about immovable objects (e.g., 111), movable objects (e.g., 112, 113, 115, 114, 2000, 3000), and living creatures (e.g., 121, 122).

The first robot device 1000 may generate a first data layer group 1001 including the classified plurality of pieces of object data. The first data layer group 1001 may include, for example, a plurality of data layers respectively corresponding to the object data, and each data layer may be combined with or separated from each other. When combining or separating the data layers, information included in each data layer may not be damaged.

The first robot device 1000 may generate an image layer indicating positions of objects of a particular type on a map showing the certain space 10 using the plurality of data layers included in the first data layer group 1001.

For example, at least one of the plurality of data layers included in the first data layer group 1001 may be used in generating a particular image layer displaying positions of the fixed wall 111 and the door 112 in the certain space 10.

Also, at least one of the plurality of data layers included in the first data layer group 1001 may be used in generating a particular image layer displaying positions of the movable wall 113, the furniture 115, and the electronic device 114 in the certain space 10.

Also, at least one of the plurality of data layers included in the first data layer group 1001 may be used in generating a particular image layer displaying positions of the person 121 and the animal 122 in the certain space 10.

For example, an image layer may be displayed through a display included in the first robot device 1000 to deliver information to a user of the first robot device 1000.

The first robot device 1000 may select another robot device from among at least one other robot device.

The first robot device 1000 may select at least one of the second robot device 2000 and the third robot device 3000, for example, to remove a floor contaminant 131 recognized based on sensing data.

The first robot device 1000 may select object data to be provided to the selected robot device from among the classified plurality of pieces of object data.

For example, the first robot device 1000 may select the second robot device 2000 as a robot device for removing a floor contaminant 131 and select the second robot device 2000, to which object data is to be transmitted. The first robot device 1000 may provide the selected second robot device 2000 with object data for removing the floor contaminant 131. For example, the first robot device 1000 may transmit the object data generated by classifying sensing data, to the second robot device 2000. The second robot device 2000 may execute a function of removing the floor contaminant 131 using the object data provided by the first robot device 1000.

For example, the second robot device 2000 may generate a second data layer group 2001 including the object data provided by the first robot device 1000. Without the need to obtain a plurality of pieces of object data by directly obtaining and classifying sensing data, the second robot device 2000 may obtain a plurality of data layers and generate the second data layer group 2001 using the object data provided by the first robot device 1000. The second robot device 2000 may execute a function based on the object data provided by the first robot device 1000.

For example, the first robot device 1000 may select the third robot device 3000 as a robot device for removing the floor contaminant 131 and select the third robot device 3000 as a robot device, to which object data is to be transmitted. The first robot device 1000 may provide the selected third robot device 3000 with object data for removing the floor contaminant 131. For example, the first robot device 1000 may transmit, to the third robot device 3000, object data that may be used by the third robot device 3000, from among the object data generated by classifying the sensing data. The third robot device 3000 may execute a function of removing the floor contaminant 131 using the object data provided by the first robot device 1000.

For example, the third robot device 3000 may generate a third data layer group 3001 including the object data provided by the first robot device 1000. Without the need to obtain a plurality of pieces of object data by directly obtaining and classifying sensing data, the third robot device 3000 may obtain a plurality of data layers and generate the third data layer group 3001 using the object data provided by the first robot device 1000. The third robot device 3000 may execute a function based on the object data provided by the first robot device 1000.

The second robot device 2000 may be requested to transmit object data, by the first robot device 1000 that has received a command to remove the floor contaminant 131. The second robot device 2000 requested to transmit object data may select the first robot device 1000 as a robot device, to which the object data is to be transmitted, and may provide the first robot device 1000 with object data for removing the floor contaminant 131. The second robot device 2000 may transmit, to the first robot device 1000, for example, object data that may be used by the first robot device 1000, from among the object data generated by classifying the sensing data. The first robot device 1000 may execute a function of removing the floor contaminant 131 using the object data provided by the second robot device 2000.

For example, the first robot device 1000 may generate the first data layer group 1001 including the object data provided by the second robot device 2000. Without the need to obtain a plurality of pieces of object data by directly obtaining and classifying sensing data, the first robot device 1000 may obtain a plurality of data layers and generate the first data layer group 1001 using the object data provided by the second robot device 2000. The first robot device 1000 may execute a function based on the object data provided by the second robot device 2000.

For reference, while three robot devices, for example, the first robot device 1000, the second robot device 2000, and the third robot device 3000 existing in the certain space are described with reference to FIG. 1 for convenience of description, the number of robot devices capable of sharing object data with one another according to the object data sharing method of the disclosure is not limited to the above.

Figure 2:
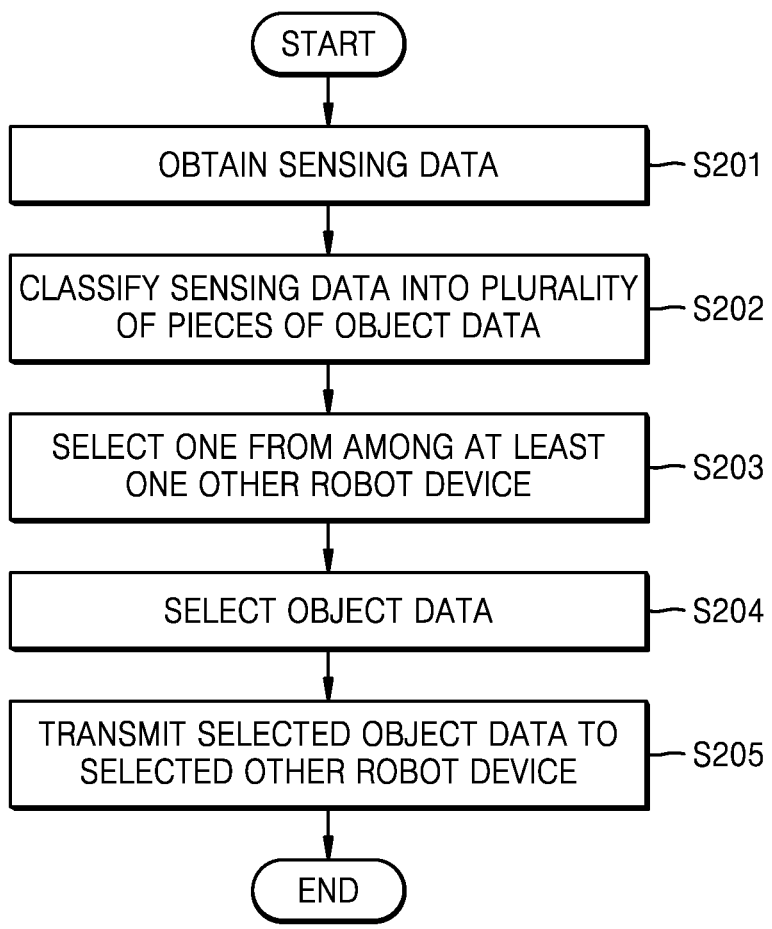
FIG. 2 is a flowchart illustrating an example method, performed by a robot device, of sharing object data, according to various embodiments of the disclosure.

FIG. 2 is a flowchart illustrating an example method, performed by a robot device, of sharing object data, according to various embodiments of the disclosure.

In operation S201, the first robot device 1000 may obtain sensing data. The first robot device 1000 may obtain sensing data about a certain space, for example, using a camera and a sensor in the first robot device 1000.

While stopping or moving to execute a function in the certain space, the first robot device 1000 may recognize an object in the certain space using a sensor and obtain sensing data about the object in the certain space. The first robot device 1000 may obtain sensing data, for example, from the second robot device 2000 and the third robot device 3000.

In operation S202, the first robot device 1000 may classify the obtained sensing data into a plurality of pieces of object data based on properties of objects. For example, and without limitation, the first robot device 1000 may classify sensing data as object data about immovable objects, movable objects, and living creatures by determining a change in a position of an object existing in a certain space, the change being recognized in real time through a sensor while performing a function in the certain space, etc.

The properties of objects, which serve as a basis for classification of sensing data may be preset. The properties of objects, as a basis for classification of sensing data, may include, for example, and without limitation, a position of each object in a three-dimensional certain space, a frequency of changes in the position, a temperature, whether the object has generated a voice, whether the object has generated a smell, or the like, but are not limited thereto.

The first robot device 1000 may classify each object as one of immovable objects, movable objects, and living creatures based on a position of each object in a three-dimensional certain space and a frequency of changes in the position. In addition, the first robot device 1000 may classify sensing data as object data about immovable objects, movable objects, and living creatures based on a position of each object in a three-dimensional certain space and a frequency of changes in the position, but the disclosure is not limited thereto.

The first robot device 1000 may classify each object as one of immovable objects, movable objects, and contaminants based on a position of each object in a three-dimensional certain space, a frequency of changes in the position, and whether the object has generated a smell. In addition, the first robot device 1000 may classify sensing data as object data about immovable objects, movable objects, and contaminants based on a position of each object in a three-dimensional certain space and a frequency of changes in the position, but the disclosure is not limited thereto.

The first robot device 1000 may execute a function based on the classified object data. For example, the first robot device 1000 may classify sensing data as object data about each of immovable objects, movable objects, and contaminants, and determine a movement path from a current position to a contaminant based on the object data about immovable objects and movable objects, but the disclosure is not limited thereto.

The first robot device 1000 may determine a cleaning method for the contaminant based on the classified object data. In addition, for example, when object data about a contaminant is about a solid contaminant, the first robot device 1000 may determine dust absorption as a cleaning method. In addition, for example, when object data about a contaminant is about a liquid contaminant, the first robot device 1000 may determine mopping as a cleaning method. In addition, for example, when object data about a contaminant is about a gas contaminant, the first robot device 1000 may determine air cleaning as a cleaning method.

The object data used by the first robot device 1000 may be obtained by the first robot device 1000 itself or may be object data obtained from at least one of the second robot device 2000 or the third robot device 3000.

In operation S203, the first robot device 1000 may select another robot device from among at least one other robot device. The first robot device 1000 may select one of the second robot device 2000 and the third robot device 3000, for example, to remove a contaminant recognized based on classification of sensing data.

In operation S204, the first robot device 1000 may select object data to be provided to the selected robot device, from among the classified plurality of pieces of object data. For example, the first robot device 1000 may provide the selected second robot device 2000 with object data for removing a contaminant. Without the need to directly obtain sensing data, the selected second robot device 2000 may be provided with object data about immovable objects for removing a contaminant and the contaminant, by the first robot device 1000.

In operation S205, the first robot device 1000 may transmit the selected object data to the selected other robot device. For example, the selected second robot device 2000 may execute a function based on the object data provided by the first robot device 1000.

Figure 3:
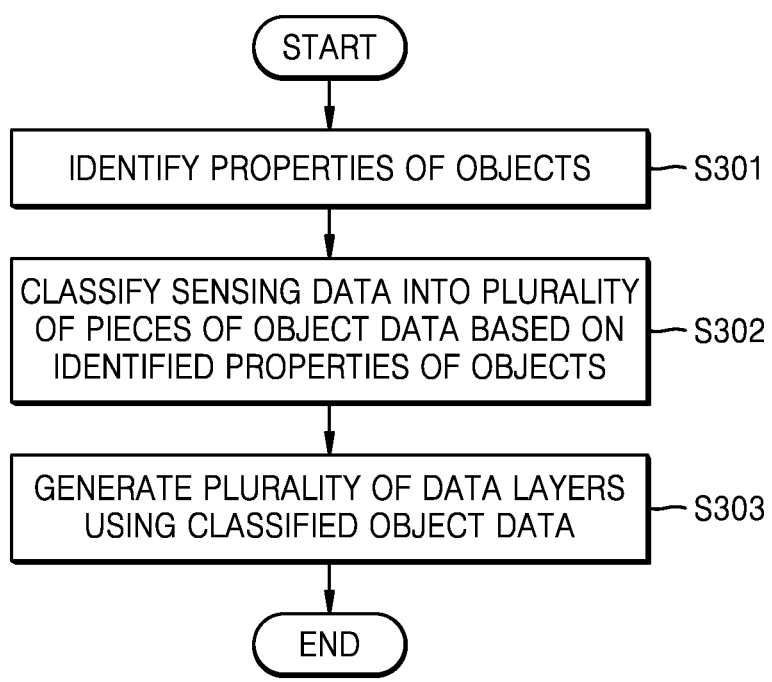
FIG. 3 is a flowchart illustrating an example method, performed by a robot device, of generating a plurality of data layers including a plurality of pieces of classified object data, according to various embodiments of the disclosure.

FIG. 3 is a flowchart illustrating an example method, performed by a robot device, of generating a plurality of data layers including a plurality of pieces of classified object data, according to various embodiments of the disclosure.

In operation S301, the first robot device 1000 may identify properties of objects. The properties of objects, which serve as a basis for classification of sensing data, may be preset. The properties of objects, as a basis for classification of sensing data, may include, for example, and without limitation, a position of each object in a three-dimensional certain space, a frequency of changes in the position, a temperature of the object, whether the object has generated voice, whether the object has generated a smell, or the like, but are not limited thereto.

When, for example, a position of a particular object in a three-dimensional certain space is changed by a frequency equal to or higher than a preset reference frequency, the first robot device 1000 may identify the object as a moving object. In addition, when, for example, a position of a particular object in a three-dimensional certain space is changed by a frequency lower than a preset reference frequency, the first robot device 1000 may identify the object as an immovable object. In addition, for example, when a temperature of a particular object is equal to or higher than a reference temperature, and the object is determined to generate voice, the first robot device 1000 may identify the object as a living creature.

When, for example, a position of a particular object in a three-dimensional certain space is changed by a frequency lower than a preset reference frequency, and the object is determined to generate a smell, the first robot device 1000 may identify the object as a solid or liquid contaminant. When, for example, a position of a particular object in a three-dimensional certain space is changed by a frequency equal to or higher than a preset reference frequency, and the object is determined to generate a smell, the first robot device 1000 may identify the object as a liquid contaminant.

In operation S302, the first robot device 1000 may classify sensing data into a plurality of pieces of object data based on the identified properties of the objects. For example, the first robot device 1000 may classify sensing data about objects in a certain space as object data about each of immovable objects and movable objects. In addition, for example, the first robot device 1000 may classify sensing data about objects in the certain space as object data about each of immovable objects, movable objects, and living creatures.

In operation S303, the first robot device 1000 may generate a plurality of data layers using the classified object data.

Figure 4A:
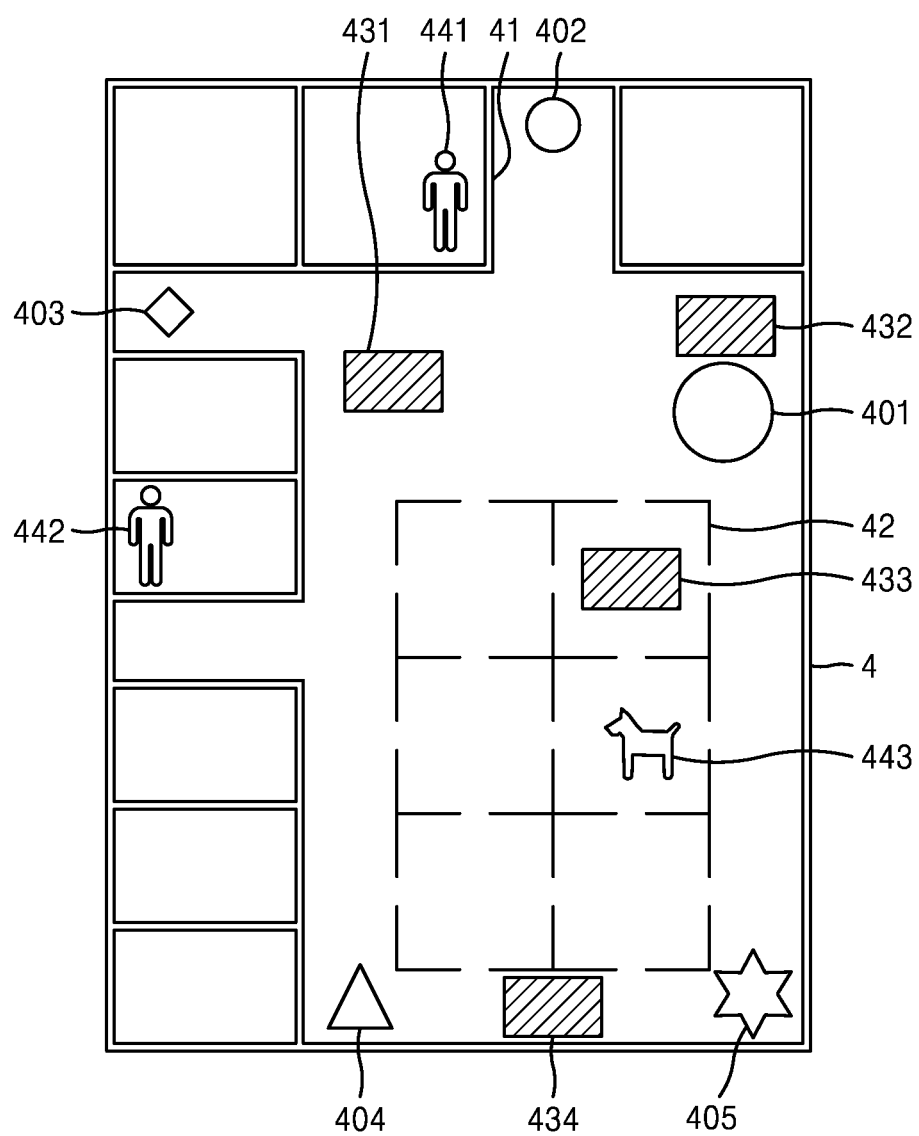
FIG. 4A is a diagram illustrating an example of sensing data obtained by a robot device, according to various embodiments of the disclosure.

FIG. 4A is a diagram illustrating an example of sensing data obtained by a robot device, according to various embodiments of the disclosure.

Referring to FIG. 4A, a first robot device 401, a second robot device 402, a third robot device 403, a fourth robot device 404, and a fifth robot device 405 may execute functions in a certain space of an office 4 where a plurality of rooms 41 and a movable wall 42 are installed and a first furniture 431, a second furniture 432, a third furniture 433, and a fourth furniture 434 are provided.

The first robot device 401, the second robot device 402, the third robot device 403, the fourth robot device 404, and the fifth robot device 405 may execute functions in the certain space of the office 4 where a first user 441, a second user 442, and a first animal 443 stay or move in real time in a particular space.

The first robot device 401, the second robot device 402, the third robot device 403, the fourth robot device 404, and the fifth robot device 405 may be, for example, robot devices that perform different functions. For example, the first robot device 401 may be an air cleaning robot, the second robot device 402 may be a vacuum cleaning robot, the third robot device 403 may be a mopping robot, the fourth robot device 404 may be a butler robot, and the fifth robot device 405 may be a logistics transferring robot.

The first robot device 401 may obtain sensing data about the plurality of rooms 41, the movable wall 42, the first furniture 431, the second furniture 432, the third furniture 433, the fourth furniture 434, the first user 441, the second user 442, and the first animal 443, for example, using a camera and a sensor in the first robot device 401.

Other robot devices, for example, the second robot device 402, the third robot device 403, the fourth robot device 404, and the fifth robot device 405 may also obtain sensing data about the plurality of rooms 41, the movable wall 42, the first furniture 431, the second furniture 432, the third furniture 433, the fourth furniture 434, the first user 441, the second user 442, and the first animal 443 using, for example, a camera and a sensor that may be provided in each robot device.

The first robot device 401 may also obtain sensing data about the plurality of rooms 41, the movable wall 42, the first furniture 431, the second furniture 432, the third furniture 433, the fourth furniture 434, the first user 441, the second user 442, and the first animal 443, for example, from other robot devices, for example, from at least one of the second robot device 402, the third robot device 403, the fourth robot device 404, or the fifth robot device 405.

FIG. 4B is a diagram illustrating examples of data layers including a plurality of pieces of object data generated by a robot device, according to various embodiments of the disclosure.

The first robot device 401 may classify the obtained sensing data about the plurality of rooms 41, the movable wall 42, the first furniture 431, the second furniture 432, the third furniture 433, the fourth furniture 434, the first user 441, the second user 442, and the first animal 443, respectively into object data about the plurality of rooms 41, object data about the movable wall 42, object data about the first furniture 431, the second furniture 432, the third furniture 433, and the fourth furniture 434, and object data about the first user 441, the second user 442, and the first animal 443.

Also, for example, the first robot device 401 may classify data about a position of the first robot device 401 and data about positions of other robot devices, for example, data about the positions of the robot devices received from at least one of the second robot device 402, the third robot device 403, the fourth robot device 404, or the fifth robot device 405, as separate object data.

For example, the first robot device 401 may classify data about a movable region of the first robot device 401 as separate object data based on the obtained sensing data about the plurality of rooms 41, the movable wall 42, the first furniture 431, the second furniture 432, the third furniture 433, the fourth furniture 434, the first user 441, the second user 442, and the first animal 443 and characteristic information data of the first robot device 401.

The first robot device 401 may classify data about movable regions of other robot devices as separate object data based on the obtained sensing data about the plurality of rooms 41, the movable wall 42, the first furniture 431, the second furniture 432, the third furniture 433, the fourth furniture 434, the first user 441, the second user 442, and the first animal 443 and characteristic information data of other robot devices, that is, the second robot device 402, the third robot device 403, the fourth robot device 404, and the fifth robot device 405.

Characteristic information data of a robot device may include characteristic information about, for example, and without limitation, a form, size, weight, operating speed, or the like of the robot device, but is not limited thereto.

Referring to FIG. 4B, the plurality of data layers including a plurality of pieces of classified object data may be respectively used in generating a plurality of image layers 451, 452, 453, 454, 455, and 456 indicating positions of objects of a particular type on a map showing a certain space of the office 4.

For example, the first robot device 401 may generate an image layer 451 about object data of the plurality of rooms 41, an image layer 452 about object data of the movable wall 42, and an image layer 453 about object data of the first furniture 431, the second furniture 432, the third furniture 433, and the fourth furniture 434.

The first robot device 401 may generate, for example, an image layer 454 about object data of positions of the first user 441, the second user 442, and the first animal 443. The first robot device 401 may generate, for example, an image layer 455 about object data of positions of the second robot device 402, the third robot device 403, the fourth robot device 404, and the fifth robot device 405.

The first robot device 401 may generate, for example, an image layer 456 about object data of a movable region of the first robot device 401. A method of using image layers will be described in greater detail below based on detailed examples with reference to FIGS. 6A, 6B, 7A, 7B, 8A and 8B.

The first robot device 401 may select at least one of a plurality of pieces of object data based on a preset data transmission period, and transmit the selected object data to another robot device.

For example, the object data about the plurality of rooms 41 may include data about a structure and position of the plurality of rooms 41, and as the positions and form of walls of the plurality of rooms 41 hardly change, a frequency of changes in the object data about the plurality of rooms 41 is the lowest from among all objects provided in the certain space of the office 4.

The object data about the movable wall 42 may include data about a structure and position of the movable wall 42, and the position and form of the movable wall 42 may be varied at a relatively high frequency compared to the plurality of rooms 41.

The object data about the first furniture 431, the second furniture 432, the third furniture 433, and the fourth furniture 434 may include data about positions of the first furniture 431, the second furniture 432, the third furniture 433, and the fourth furniture 434, and a position and form of each piece of furniture may vary at a higher frequency than the movable wall 42.

The object data about the first user 441, the second user 442, and the first animal 443 may include data about positions of the first user 441, the second user 442, and the first animal 443, and a frequency of changes in the object data about the first user 441, the second user 442, and the first animal 443 is highest from among all objects provided in the certain space of the office 4.

The first robot device 401 may provide the object data about the plurality of rooms 41 to another robot device, for example, at least one of the second robot device 402, the third robot device 403, the fourth robot device 404, or the fifth robot device 405, according to a preset data transmission period.

For example, the first robot device 401 may transmit the object data about the plurality of rooms 41, which has a lowest change frequency from among all objects provided in the certain space of the office 4, to all the other robot devices according to a preset first period. The preset first period may be, for example, transmitting object data only once after all robot devices are arranged.

The first robot device 401 may provide the object data about the movable wall 42, to another robot device, for example, at least one of the second robot device 402, the third robot device 403, the fourth robot device 404, or the fifth robot device 405 according to a preset data transmission period.

The first robot device 401 may transmit, for example, the object data about the movable wall 42 to all the other robot devices according to a preset second period. The preset second period may be, for example, transmitting the object data about the movable wall 42 to at least one of the other robot devices only one time at each start of an operation of the first robot device 401.

The first robot device 401 may provide the object data about the first furniture 431, the second furniture 432, the third furniture 433, and the fourth furniture 434, to another robot device, for example, at least one of the second robot device 402, the third robot device 403, the fourth robot device 404, or the fifth robot device 405 according to a preset data transmission period.

For example, the first robot device 401 may transmit the object data about the first furniture 431, the second furniture 432, the third furniture 433, and the fourth furniture 434 to all the other robot devices according to a preset third period.

In addition, for example, the first robot device 401 may store the object data about the first furniture 431, the second furniture 432, the third furniture 433, and the fourth furniture 434 in a memory included in the first robot device 401 every preset third period to update the object data about the first furniture 431, the second furniture 432, the third furniture 433, and the fourth furniture 434.

The first robot device 401 may provide the object data about the first user 441, the second user 442, and the first animal 443, to another robot device, that is, at least one of the second robot device 402, the third robot device 403, the fourth robot device 404, or the fifth robot device 405 according to a preset data transmission period.

For example, the first robot device 401 may transmit the object data about the first furniture 431, the second furniture 432, the third furniture 433, and the fourth furniture 434 to all the other robot devices every preset fourth period.

In addition, the first robot device 401 may store the object data about the first user 441, the second user 442, and the first animal 443 in a memory included in the first robot device 401 every preset fourth period to update the object data about the first user 441, the second user 442, and the first animal 443.

According to a preset data transmission period, the first robot device 401 may provide object data about positions of all robot devices, for example, the first robot device 401, the second robot device 402, the third robot device 403, the fourth robot device 404, and the fifth robot device 405, to another robot device, that is, to at least one of the second robot device 402, the third robot device 403, the fourth robot device 404, or the fifth robot device 405. For example, the first robot device 401 may transmit the object data about the positions of all robot devices to all the other robot devices every preset fifth period.

According to a preset data transmission period, the first robot device 401 may provide the object data about a movable region of the first robot device 401, to another robot device, that is, at least one of the second robot device 402, the third robot device 403, the fourth robot device 404, or the fifth robot device 405.

For example, when the object data about a movable region of the first robot device 401 is identical to object data about movable regions of the second robot device 402, the third robot device 403, and the fourth robot device 404, the first robot device 401 may transmit the object data about a movable region of the first robot device 401 to the second robot device 402, the third robot device 403, and the fourth robot device 404 according to a preset data transmission period.

For example, the first robot device 401 may transmit the object data about a movable region of the first robot device 401 to the second robot device 402, the third robot device 403, and the fourth robot device 404 every preset sixth period.

Without the need to generate object data about movable regions by directly obtaining and classifying sensing data, the second robot device 402, the third robot device 403, and the fourth robot device 404 may execute functions using the object data about a movable region of the first robot device 401, received from the first robot device 401.

When, for example, the object data about a movable region of the first robot device 401 is not identical to object data about a movable region of the fifth robot device 405, the first robot device 401 may not transmit the object data about a movable region of the first robot device 401 to the fifth robot device 405.

For example, the fifth robot device 405 may not receive the object data about a movable region of the first robot device 401 from the first robot device 401, but may execute a function using object data about a movable region of the fifth robot device 405, the object data about the movable region of the fifth robot device 405 being generated by directly obtaining and classifying sensing data by the fifth robot device 405.

The first robot device 401 may transmit, according to the preset first period, the object data about the plurality of rooms 41 to all the other robot devices only once after arrangement of all of the robot devices, and may transmit, according to the preset second period, the object data about the movable wall 42 to all the other robot devices only once at each start of an operation of the first robot device 401.

In addition, the first robot device 401 may transmit, for example, the object data about the first furniture 431, the second furniture 432, the third furniture 433, and the fourth furniture 434 to all the other robot devices according to the preset third period. The preset third period may have a higher data transmission frequency than, for example, the first period and the second period, and may have a lower data transmission frequency than the fourth period and the fifth period.

In addition, the first robot device 401 may transmit, for example, the object data about the first user 441, the second user 442, and the first animal 443 to all the other robot devices every preset fourth period. The preset fourth period may have a higher data transmission frequency than, for example, the first through third periods, and may have an equal data transmission frequency to the fifth period.

In addition, the first robot device 401 may transmit, for example, the object data about the positions of all robot devices to all the other robot devices every preset fifth period. The preset fifth period may have a higher data transmission frequency than, for example, the first through third periods, and may have an equal data transmission frequency to the fourth period.

The first robot device 401 may, for example, transmit, according to a preset sixth period, the object data about a movable region of the first robot device 401 to the second robot device 402, the third robot device 403, and the fourth robot device 404 which may use the same object data as the object data about a movable region of the first robot device 401.

The preset sixth period may be, for example, transmitting the object data about a movable region of the first robot device 401 to the second robot device 402, the third robot device 403, and the fourth robot device 404, when there is a change in at least one of the object data about the first furniture 431, the second furniture 432, the third furniture 433, or the fourth furniture 434, the object data about the first user 441, the second user 442, and the first animal 443, and the object data about the positions of all of the robot devices.

Figure 5A:
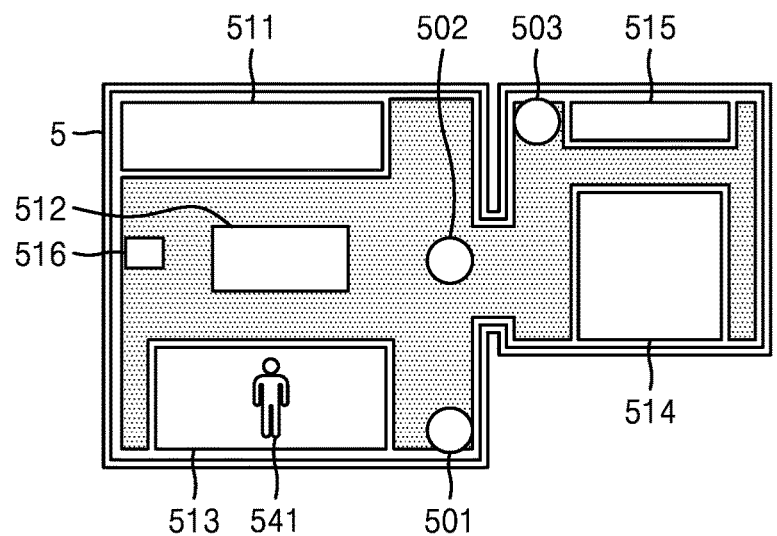
FIG. 5A is a diagram illustrating an example of sensing data obtained by a robot device, according to various embodiments of the disclosure.

FIG. 5A is a diagram illustrating an example of sensing data obtained by a robot device, according to various embodiments of the disclosure.

Referring to FIG. 5A, a first robot device 501, a second robot device 502, and a third robot device 503 may execute functions in a certain space of a home 5 in which a first furniture 511, a second furniture 512, a third furniture 513, a fourth furniture 514, a fifth furniture 515, and a sixth furniture 516 are provided.

The first robot device 501, the second robot device 502, and the third robot device 503 may execute functions in the certain space of the home 5 where a first user 541 stays or moves in real time in a particular space.

The first robot device 501 may obtain sensing data about the first furniture 511, the second furniture 512, the third furniture 513, the fourth furniture 514, the fifth furniture 515, the sixth furniture 516, and the first user 541, for example, using a camera and a sensor in the first robot device 501. The first robot device 501 may also obtain sensing data about the first furniture 511, the second furniture 512, the third furniture 513, the fourth furniture 514, the fifth furniture 515, the sixth furniture 516, and the first user 541, for example, from other robot devices, for example, from at least one of the second robot device 502 or the third robot device 503.

The first robot device 501 may classify the obtained sensing data about the first furniture 511, the second furniture 512, the third furniture 513, the fourth furniture 514, the fifth furniture 515, the sixth furniture 516, and the first user 541, for example, respectively into object data about the first furniture 511, the second furniture 512, the third furniture 513, the fourth furniture 514, the fifth furniture 515, and the sixth furniture 516, and object data about the first user 541.

In addition, for example, the first robot device 501 may classify data about positions of the first robot device 501, the second robot device 502, and the third robot device 503, as separate object data.

For example, the first robot device 501 may classify data about a movable region of the first robot device 501 as separate object data based on the obtained sensing data about the first furniture 511, the second furniture 512, the third furniture 513, the fourth furniture 514, the fifth furniture 515, and the sixth furniture 516, and the first user 541 and characteristic information data of the first robot device 501. In addition, for example, the first robot device 501 may also classify data about a movable region of the second robot device 502 as separate object data based on the obtained sensing data about the first furniture 511, the second furniture 512, the third furniture 513, the fourth furniture 514, the fifth furniture 515, and the sixth furniture 516, and characteristic information data of the second robot device 502.

Figure 5B:
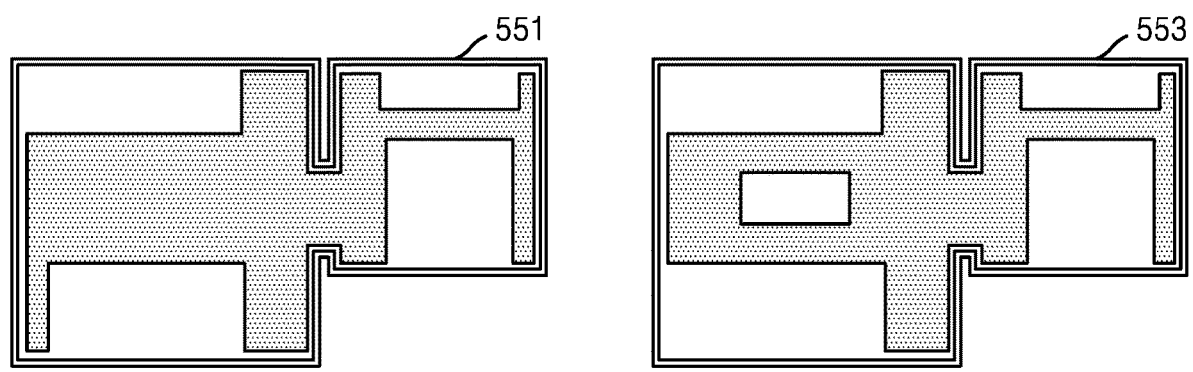
FIG. 5B is a diagram illustrating example object data about a movable region of a robot device, according to various embodiments of the disclosure.

FIG. 5B is a diagram illustrating example object data about a movable region of a robot device, according to various embodiments of the disclosure.

According to a size and form of a robot device, object data about a movable region of the first robot device 501 may be different from object data about a movable region of the second robot device 502. In the certain space of the home 5, for example, a data layer about the object data of a movable region of the first robot device 501 may be different from a data layer about the object data about a movable region of the second robot device 502.

For example, when the object data about a movable region of the first robot device 501 is not identical to the object data about a movable region of the second robot device 502, the first robot device 501 may not transmit the object data about a movable region of the first robot device 501 to the second robot device 502.

A form of the first robot device 501 may have, for example, a lower height than a form of the second robot device 502. The second furniture 512 may be, for example, a furniture that supports the floor with legs that are longer than a height of the first robot device 501. In addition, the second furniture 512 may be, for example, a furniture that supports the floor with legs that are shorter than a height of the second robot device 502. The first robot device 501 has a smaller height than a length of the legs of the second furniture 512 and thus may pass through a lower end of the second furniture 512, and the second robot device 502 has a greater height than a length of the legs of the second furniture 512 and thus may not pass through the lower end of the second furniture 512.

The data layer about the object data of a movable region of the first robot device 501 may be used in generating a first image layer 551, and the data layer about the object data of a movable region of the second robot device 502 may be used in generating a second image layer 553. Referring to FIG. 5B, as the object data about a movable region of the first robot device 501 and the object data about a movable region of the second robot device 502 are different from each other, the first image layer 551 and the second image layer 553 have different shapes.

Figure 6A:
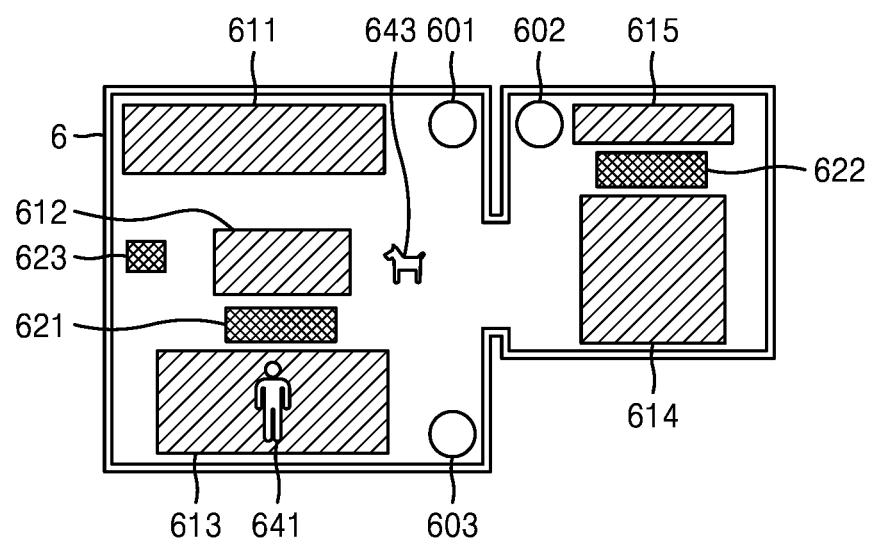
FIG. 6A is a diagram illustrating an example of sensing data obtained by a robot device, according to various embodiments of the disclosure.

FIG. 6A is a diagram illustrating an example of sensing data obtained by a robot device, according to various embodiments of the disclosure.

Referring to FIG. 6A, a first robot device 601, a second robot device 602, and a third robot device 603 may perform functions in a certain space of a home 6 in which a first furniture 611, a second furniture 612, a third furniture 613, a fourth furniture 614, a fifth furniture 615, a first rug 621, a second rug 622, and a first flower pot 623 are provided.

The first robot device 601, the second robot device 602, and the third robot device 603 may execute functions in the certain space of the home 6 where a first user 641 and a first animal 643 stay or move in real time in a particular space.

The first robot device 601 may obtain sensing data about the first furniture 611, the second furniture 612, the third furniture 613, the fourth furniture 614, the fifth furniture 615, the first rug 621, the second rug 622, the first flower pot 623, the first user 641, and the first animal 643, for example, using a camera and a sensor in the first robot device 601. The first robot device 601 may also obtain sensing data about the first furniture 611, the second furniture 612, the third furniture 613, the fourth furniture 614, the fifth furniture 615, the first rug 621, the second rug 622, the first flower pot 623, the first user 641, and the first animal 643, for example, from other robot devices, for example, from at least one of the second robot device 502 or the third robot device 503.

For example, the first robot device 601 may classify the obtained sensing data about the first furniture 611, the second furniture 612, the third furniture 613, the fourth furniture 614, the fifth furniture 615, the first rug 621, the second rug 622, the first flower pot 623, the first user 641, and the first animal 643, into object data about the first furniture 611, the second furniture 612, the third furniture 613, the fourth furniture 614, and the fifth furniture 615, object data about the first rug 621, the second rug 622, and the first flower pot 623 and object data about the first user 641, and the first animal 643.

In addition, for example, the first robot device 601 may classify data about a position of the first robot device 601 and data about positions of other robot devices, that is, data about the positions of the robot devices received from at least one of the second robot device 602 or the third robot device 603, as separate object data.

The first robot device 601 may classify data about a movable region of the first robot device 601 as separate object data based on the obtained the sensing data about the first furniture 611, the second furniture 612, the third furniture 613, the fourth furniture 614, the fifth furniture 615, the first rug 621, the second rug 622, the first flower pot 623, the first user 641, and the first animal 643 and characteristic information data of the first robot device 601.

Figure 6B:
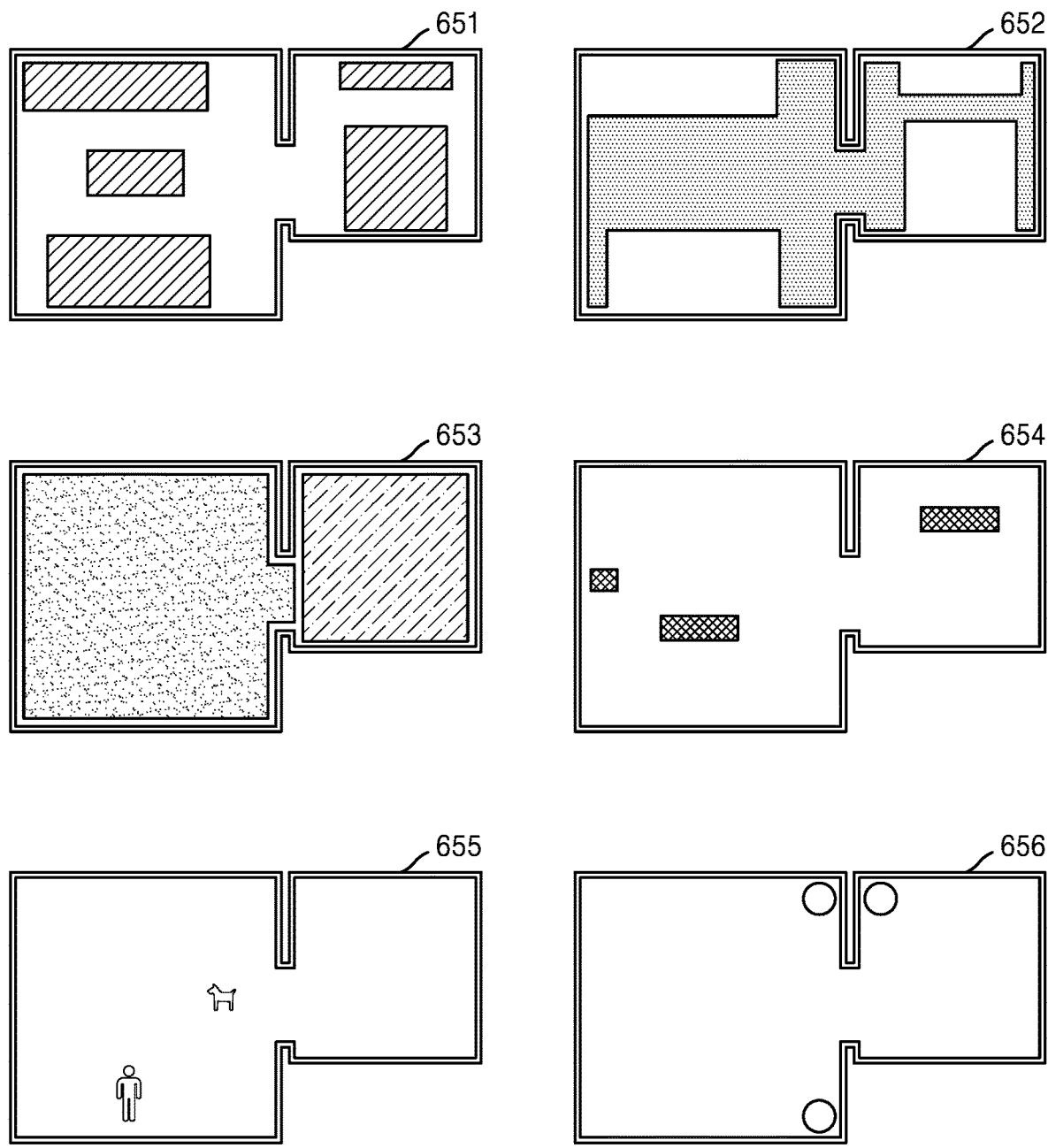
FIG. 6B is a diagram illustrating examples of data layers including a plurality of pieces of object data generated by a robot device, according to various embodiments of the disclosure.

FIG. 6B is a diagram illustrating examples of data layers including a plurality of pieces of object data generated by a robot device, according to various embodiments of the disclosure.

For example, the first robot device 601 may classify the obtained sensing data about the first furniture 611, the second furniture 612, the third furniture 613, the fourth furniture 614, the fifth furniture 615, the first rug 621, the second rug 622, the first flower pot 623, the first user 641, and the first animal 643, into object data about the first furniture 611, the second furniture 612, the third furniture 613, the fourth furniture 614, and the fifth furniture 615, object data about the first rug 621, the second rug 622, and the first flower pot 623 and object data about the first user 641, and the first animal 643.

In addition, for example, the first robot device 601 may classify data about a position of the first robot device 601 and data about positions of other robot devices, that is, data about the positions of the robot devices received from at least one of the second robot device 602 or the third robot device 603, as separate object data.

The first robot device 601 may classify data about a movable region of the first robot device 601 as separate object data based on the obtained the sensing data about the first furniture 611, the second furniture 612, the third furniture 613, the fourth furniture 614, the fifth furniture 615, the first rug 621, the second rug 622, the first flower pot 623, the first user 641, and the first animal 643 and characteristic information data of the first robot device 601.

Referring to FIG. 6B, a plurality of data layers including a plurality of pieces of classified object data may be respectively used in generating a plurality of image layers 651, 652, 653, 654, 655, and 656 indicating positions of objects of a particular type on a map showing a certain space of the home 6.

The first robot device 601 may generate, for example, an image layer 651 about the object data of the first furniture 611, the second furniture 612, the third furniture 613, the fourth furniture 614, and the fifth furniture 615, an image layer 654 about the object data of the first rug 621, the second rug 622, and the first flower pot 623, and an image layer 655 about the object data of the first user 641 and the first animal 643.

The first robot device 601 may generate, for example, an image layer 652 about the object data of a movable region of the first robot device 601. In addition, the first robot device 601 may generate, for example, an image layer 653 about object data that divides the certain space of the home 6 according to a lifestyle purpose of the first user 641. The first robot device 601 may generate, for example, an image layer 656 about object data of positions of the respective robot devices.

FIG. 7A is a diagram illustrating an example in which an image layer is displayed on a display during movement of a robot device, according to various embodiments of the disclosure.

The first robot device 601 may selectively display an image layer on the display based on a progress status of execution of a function with respect to a target area.

Referring to FIGS. 6B and 7A, in response to a user command to execute a function around the first furniture 611, the first robot device 601 may draw near the first furniture 611 to execute a dust absorption function around the first furniture 611.

While drawing near the first furniture 611, the first robot device 601 may selectively display, on the display, the image layer 651 about the object data of the first furniture 611, the second furniture 612, the third furniture 613, the fourth furniture 614, and the fifth furniture 615, the image layer 652 about the object data of a movable region of the first robot device 601, and the image layer 656 about the object data of the positions of the respective robot devices.

For example, while drawing near the first furniture 611 to execute a dust absorption function around the first furniture 611, the first robot device 601 may display, on the display, the image layer 656 about the object data of the positions of the respective robot device.

For example, while drawing near the first furniture 611 to execute a dust absorption function around the first furniture 611, the first robot device 601 may display an image object corresponding to the first robot device 601 from among image objects indicating the respective robot devices included in the image layer 656, using a moving and blinking method. The first robot device 601 may display an image object corresponding to the other robot devices 602 and 603 differently from a displaying method of displaying the image object corresponding to the first robot device 601.

In addition, for example, while drawing near the first furniture 611 to execute a dust absorption function around the first furniture 611, the first robot device 601 may display, on the display, the image layer 652 about the object data of a movable region of the first robot device 601.

In addition, for example, while drawing near the first furniture 611 to execute a dust absorption function around the first furniture 611, the first robot device 601 may display, on the display, the image layer 651 about the object data of the first furniture 611, the second furniture 612, the third furniture 613, the fourth furniture 614, and the fifth furniture 615.

For example, while drawing near the first furniture 611 to execute a dust absorption function around the first furniture 611, the first robot device 601 may display an image object corresponding to the first furniture 611 from among image objects included in the image layer 651 and indicating each piece of furniture, using a blinking method. The first robot device 601 may display image objects corresponding to the other furniture 612, 613, 614, 615 differently from a displaying method of displaying the image object corresponding to the first furniture 611.

FIG. 7B is a diagram illustrating an example in which an image layer is displayed on a display during execution of a function by a robot device, according to various embodiments of the disclosure.

Referring to FIGS. 6B and 7B, the first robot device 601 may execute a dust absorption function around the first furniture 611 in response to a user command to execute a function around the first furniture 611.

While executing a dust absorption function around the first furniture 611, the first robot device 601 may selectively display, on the display, the image layer 651 about the object data of the first furniture 611, the second furniture 612, the third furniture 613, the fourth furniture 614, and the fifth furniture 615 and the image layer 656 about the object data of the positions of the respective robot devices.

For example, while executing a dust absorption function around the first furniture 611, the first robot device 601 may display, on the display, the image layer 656 about the object data of the positions of the respective robot devices.

For example, while executing a dust absorption function around the first furniture 611, the first robot device 601 may display an image object corresponding to the first robot device 601 from among the image objects indicating the respective robot devices included in the image layer 656, using a moving and blinking method. The first robot device 601 may display an image object corresponding to the other robot devices 602 and 603 differently from a displaying method of displaying the image object corresponding to the first robot device 601.

In addition, for example, while executing a dust absorption function around the first furniture 611, the first robot device 601 may display, on the display, the image layer 651 about the object data of the first furniture 611, the second furniture 612, the third furniture 613, the fourth furniture 614, and the fifth furniture 615.

For example, while executing a dust absorption function around the first furniture 611, the first robot device 601 may display the image object corresponding to the first furniture 611 from among the image objects indicating the furniture included in the image layer 651, in a different chroma from the other image objects corresponding to the other furniture 612, 613, 614, and 615.

FIG. 8A is a diagram illustrating an example in which an image layer is displayed on a display during movement of a robot device, according to various embodiments of the disclosure.

The third robot device 603 may selectively display an image layer on the display based on a progress status of execution of a function with respect to a target area.

Referring to FIGS. 6B and 8A, in response to a user command to execute a function in the first life area 863, the third robot device 603 may move to a first life area 863 to execute an air cleaning function in the first life area 863.

While moving to the first life area 863, the third robot device 603 may selectively display, on a display, the image layer 653 about the object data that divides the certain space of the home 6 according to lifestyle purposes of the first user 641, an image layer 852 about object data of a movable region of the third robot device 603, and the image layer 656 about the object data of the positions of the respective robot devices.

For example, while moving to the first life area 863 to execute an air cleaning function in the first life area 863, the third robot device 603 may display, on the display, the image layer 656 about the object data of the positions of the respective robot devices.

For example, while moving to the first life area 863 to execute an air cleaning function in the first life area 863, the third robot device 603 may display an image object corresponding to the third robot device 603 from among the image objects indicating robot devices included in the image layer 656, using a moving and blinking method. The third robot device 603 may display an image object corresponding to the other robot devices 601 and 602 differently from a displaying method of displaying the image object corresponding to the third robot device 603.

In addition, while moving to the first life area 863 to execute an air cleaning function in the first life area 863, the third robot device 603 may display, on the display, the image layer 852 about the object data of a movable region of the third robot device 603.

In addition, while moving to the first life area 863 to execute an air cleaning function in the first life area 863, the third robot device 603 may display the image layer 653 about the object data that divides the certain space of the home 6 according to a lifestyle purpose of the first user 641.

For example, while moving to the first life area 863 to execute an air cleaning function in the first life area 863, the third robot device 603 may display an image object corresponding to the first life area 863 from among image objects indicating lifestyle purposes and included in the image layer 656, using a blinking method. The third robot device 603 may display image objects corresponding to the other lifestyle purposes differently from a displaying method of displaying the image object corresponding to the first life area 863.

FIG. 8B is a diagram illustrating an example in which an image layer is displayed on a display during execution of a function by a robot device, according to various embodiments of the disclosure.

Referring to FIG. 8B, the third robot device 603 may execute an air cleaning function in the first life area 863 in response to a user command to execute a function in the first life area 863.

While executing an air cleaning function in the first life area 863, the third robot device 603 may selectively display, on the display, the image layer 653 about the object data that divides the certain space of the home 6 according to lifestyle purposes of the first user 641 and the image layer 656 about the object data of the positions of the respective robot devices.

For example, while executing an air cleaning function in the first life area 863, the third robot device 603 may display, on the display, the image layer 656 about the object data of the positions of the respective robot devices.

For example, while executing an air cleaning function in the first life area 863, the third robot device 603 may display the image object corresponding to the third robot device 603 from among the image objects indicating robot devices included in the image layer 656, using a rotating method. The third robot device 603 may display an image object corresponding to the other robot devices 601 and 602 differently from a displaying method of displaying the image object corresponding to the third robot device 603.

In addition, while executing an air cleaning function in the first life area 863, the third robot device 603 may display, on the display, the image layer 653 about the object data that divides the certain space of the home 6 according to the lifestyle purpose of the first user 641.

For example, while executing an air cleaning function in the first life area 863, the third robot device 603 may display the image object corresponding to the first life area 863 from among the image objects indicating life areas included in the image layer 653, in a different chroma from other image objects corresponding to the other life areas.

While the displaying method of image objects included in each image layer in the embodiments of the disclosure of FIGS. 7A through 8B are described to be a blinking method, a moving method, or a chroma modifying method, the displaying method is not limited thereto.

Figure 9:
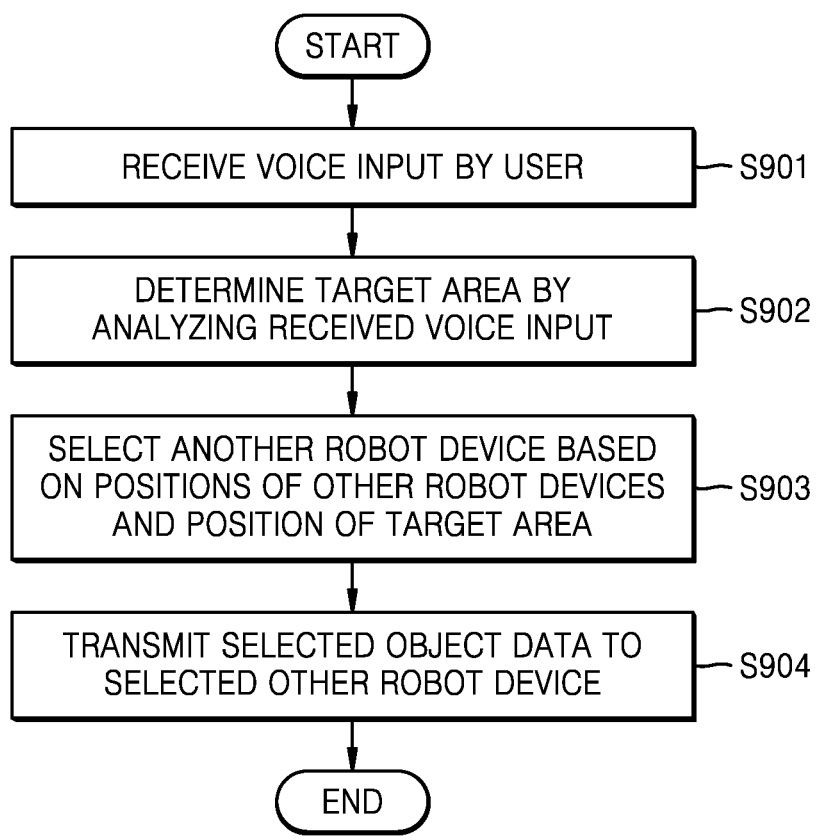
FIG. 9 is a flowchart illustrating an example method, performed by a robot device, of sharing object data based on a position of another robot device and a position of a target area, according to various embodiments of the disclosure.

FIG. 9 is a flowchart illustrating an example method, performed by a robot device, of sharing object data based on a position of another robot device and a position of a target area, according to some embodiments of the disclosure.

In operation S901, the first robot device 1000 may receive a voice input by a user. For example, the first robot device 1000 may receive a user's voice input through a microphone included in or connected to a user inputter (e.g., input circuitry) of the first robot device 1000. The received user's voice input may be, for example, a voice input of executing a function at a particular location in a certain space.

In operation S902, the first robot device 1000 may determine a target area by analyzing the received voice input. For example, the first robot device 1000 may determine a target function and a target area by analyzing the received user's voice input. For example, the first robot device 1000 may analyze a voice input by a user, for example, "bring the water cup," and determine an object carrying function as a target function and a kitchen as a target area.

In operation S903, the first robot device 1000 may select another robot device based on positions of other robot devices and a position of the target area.

After determining an object carrying function as the target function the kitchen as the target area, the first robot device 1000 may select a robot device to execute the target function based on the positions of the other robot devices and the position of the target area.

For example, when the first robot device 1000 is not closest to the kitchen which is the target area, from among all robot devices, the first robot device 1000 may select another robot device that is closest to the kitchen that is the target area, from among the other robot devices besides the first robot device 1000.

When, for example, the first robot device 1000 is the closest to the kitchen that is the target area, from among all robot devices, the first robot device 1000 may also execute the target function by moving to the kitchen by itself.

In operation S904, the first robot device 1000 may transmit selected object data to the selected other robot device. For example, the first robot device 1000 may transmit object data needed to execute the determined target function in the target area, to the other robot device. For example, the first robot device 1000 may select another robot device that is located closest to the kitchen that is the target area, from among other robot devices, and transmit object data about immovable objects, which may include object data related to the position and structure of the kitchen, to the selected other robot device.

Figure 10:
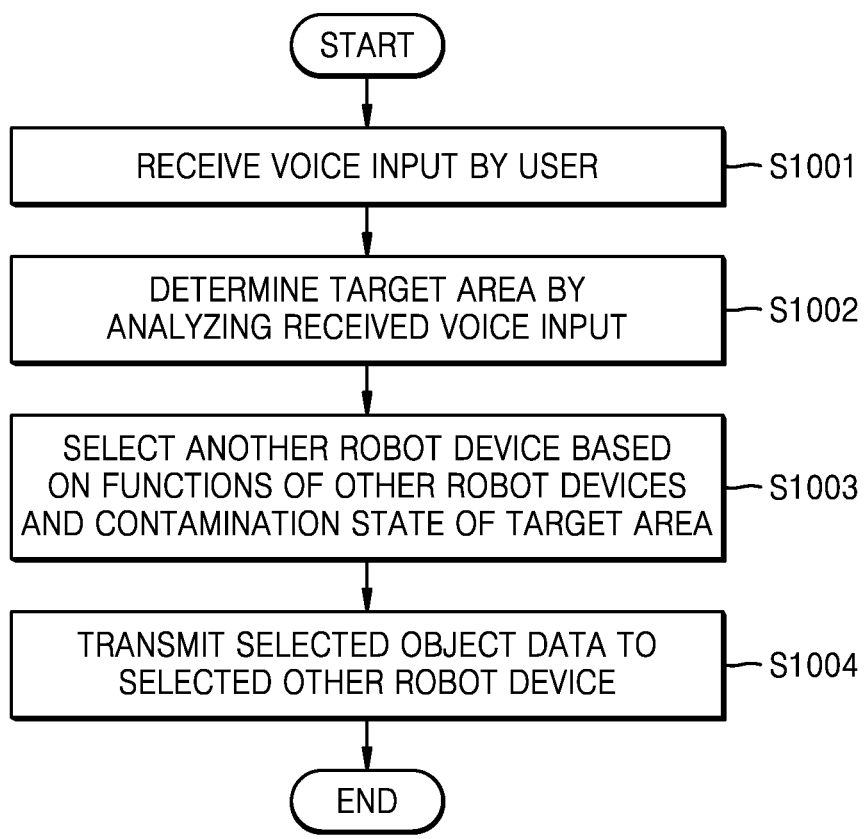
FIG. 10 is a flowchart illustrating an example method, performed by a robot device, of sharing object data based on a function of another robot device and a contamination state of a target area, according to various embodiments of the disclosure.

FIG. 10 is a flowchart illustrating an example method, performed by a robot device, of sharing object data based on a function of another robot device and a contamination state of a target area, according to various embodiments of the disclosure.

In operation S1001, the first robot device 1000 may receive a voice input by a user. For example, the first robot device 1000 may receive a user's voice input through a microphone included in or connected to a user inputter of the first robot device 1000. The received user's voice input may be, for example, a voice input of executing a function at a particular location in a certain space.

In operation S1002, the first robot device 1000 may determine a target area by analyzing the received voice input. For example, the first robot device 1000 may determine a target function and a target area by analyzing the received user's voice input. For example, the first robot device 1000 may analyze a voice input by a user, for example, "clean the air of the bedroom," and determine an air cleaning function as a target function and the bedroom as a target area.

In operation S1003, the first robot device 1000 may select another robot device based on functions of other robot devices and a contamination state of the target area.

After determining an air cleaning function as the target function and the bedroom as the target area, the first robot device 1000 may select another robot device to execute the air cleaning function in the bedroom from among all robot devices, based on the functions of the robot devices and the contamination state of the target area. When, for example, the first robot device 1000 is not able to perform an air cleaning function, the first robot device 1000 may select another robot device that is able to execute an air cleaning function.

In operation S1004, the first robot device 1000 may transmit the selected object data to the selected other robot device. For example, the first robot device 1000 may transmit object data needed to execute the determined target function in the target area, to the other robot device. For example, the first robot device 1000 may select another robot device that is able to execute an air cleaning function in the bedroom that is the target area, from among other robot devices, and transmit object data about immovable objects, which may include object data related to the position and structure of the bedroom, to the selected other robot device.

Figure 11:
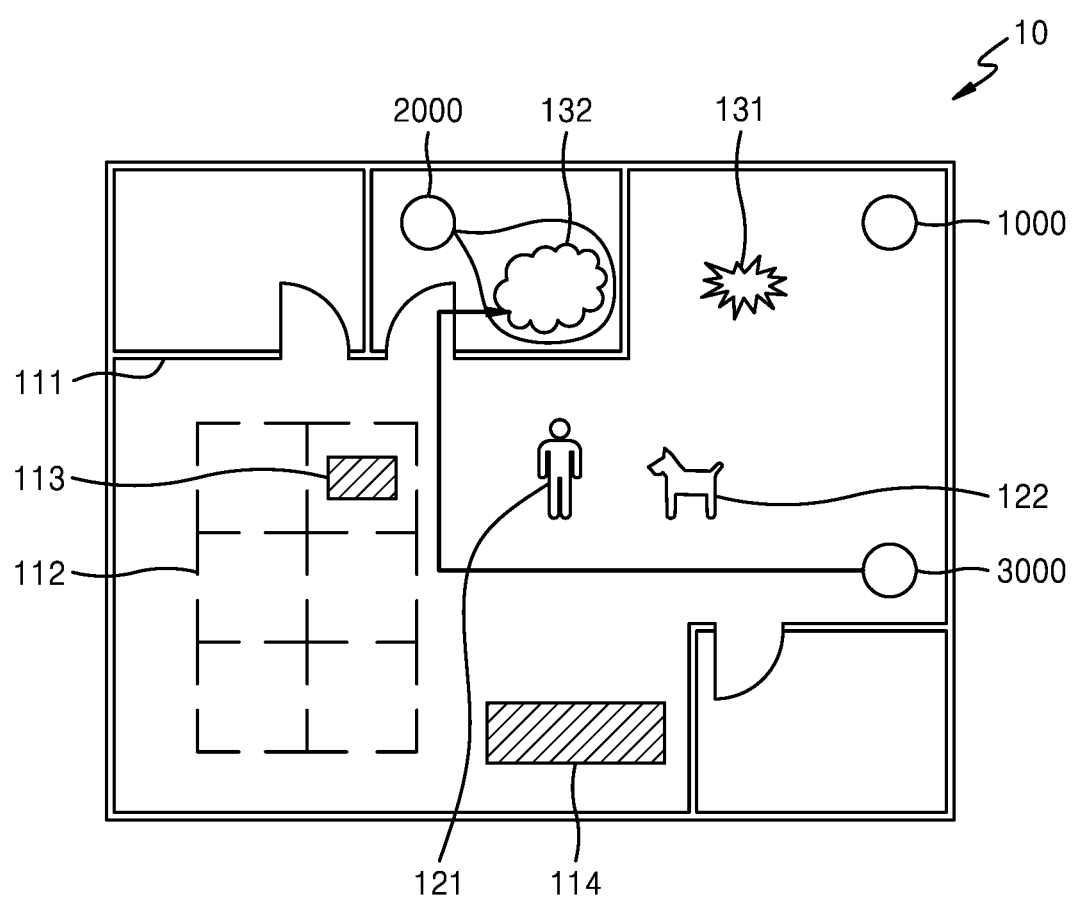
FIG. 11 is a diagram illustrating an example method, performed by a robot device, of sharing object data based on a function of another robot device and a contamination state of a target area, according to various embodiments of the disclosure.

FIG. 11 is a diagram illustrating an example method, performed by a robot device, of sharing object data based on a function of another robot device and a contamination state of a target area, according to various embodiments of the disclosure.

Referring to FIG. 11, the second robot device 2000 may remove a liquid contaminant while performing a function in a study. For example, the second robot device 2000 may analyze a voice input by a user, for example, "clean the study," and determine removing of a liquid contaminant as a target function and the study as a target area. The second robot device 2000 may directly recognize a liquid contaminant on the floor of the study, for example, using a sensor included in the second robot device 2000, to determine removing of a liquid contaminant as the target function and the study as the target area.

For example, to remove a liquid contaminant, the second robot device 2000 may execute a function in the study based on object data about immovable objects, which may include object data about the position and structure of the study, and object data about a position of the liquid contaminant.

After removing the liquid contaminant, the second robot device 2000 may determine that a gas contaminant 132 exists in the study due to the liquid contaminant and transmit object data for removing the gas contaminant 132 of the study to another robot device. For example, to remove the gas contaminant 132 of the study, the second robot device 2000 may transmit object data about immovable objects, which may include object data about the position and structure of the study, and object data about a position of the liquid contaminant, to the third robot device 3000 which is able to execute an air cleaning function.

The third robot device 3000 that has received, from the second robot device 2000, the object data about immovable objects, which may include object data about the position and structure of the study, and the object data about the position of the liquid contaminant may identify the position and structure of the study based on the object data about immovable objects and identify a position of the gas contaminant 132 based on the object data about the position of the liquid contaminant.

After identifying the position and structure of the study and the position of the gas contaminant 132, the third robot device 3000 may move to the study to execute an air cleaning function to remove the gas contaminant 132.

Figure 12:
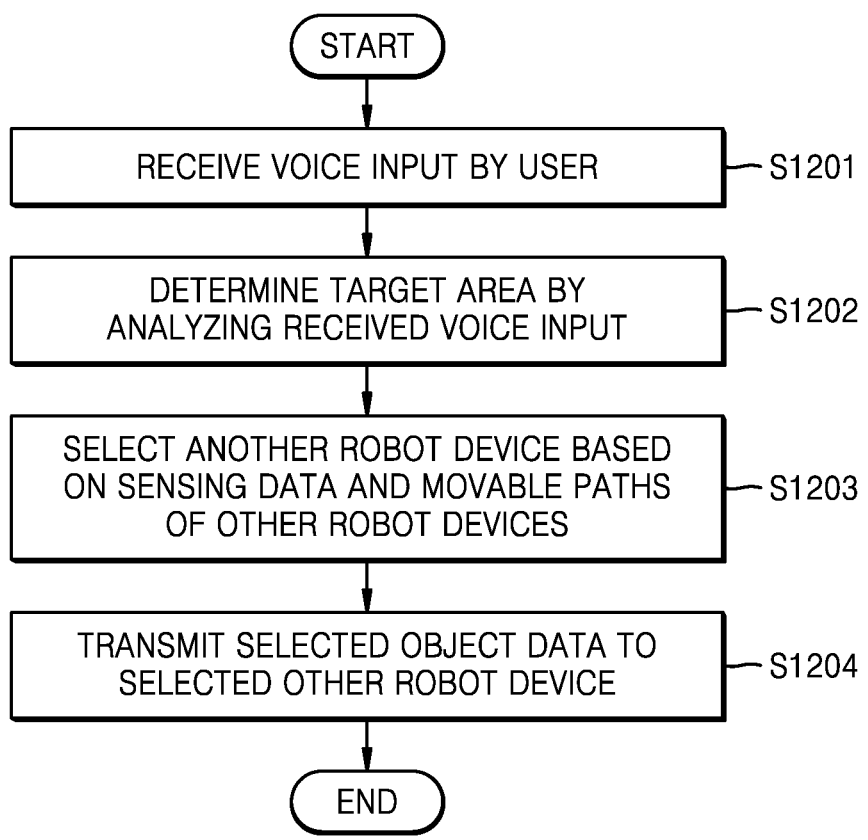
FIG. 12 is a flowchart illustrating an example method, performed by a robot device, of sharing object data based on sensing data and a movable path of another robot device, according to various embodiments of the disclosure.

FIG. 12 is a flowchart illustrating an example method, performed by a robot device, of sharing object data based on sensing data and a movable path of another robot device, according to various embodiments of the disclosure.

In operation S1201, the first robot device 1000 may receive a voice input by a user. For example, the first robot device 1000 may determine a target function and a target area by analyzing the received user's voice input. The received user's voice input may be, for example, a voice input of executing a function at a particular location in a certain space.

In operation S1202, the first robot device 1000 may determine a target area by analyzing the received voice input. For example, the first robot device 1000 may determine a target function and a target area by analyzing the received user's voice input. For example, the first robot device 1000 may analyze a voice input by a user, for example, "clean the floor of the living room," and determine a dust absorption function as a target function and the living room as a target area.

In operation S1203, the first robot device 1000 may select another robot device based on sensing data and movable paths of the other robot devices. After determining a dust absorption function as the target function and the living room as the target area, the first robot device 1000 may select a robot device to execute the dust absorption function in the living room from among all robot devices, based on the movable paths of the respective robot devices. When, for example, the first robot device 1000 is not able to execute a dust absorption function, the first robot device 1000 may select another robot device that is able to move to the living room from among other robot devices able to execute a dust absorption function.

In operation S1204, the first robot device 1000 may transmit the selected object data to the selected other robot device. For example, the first robot device 1000 may transmit object data needed to execute the determined target function in the target area, to another robot device. For example, the first robot device 1000 may select another robot device that is able to execute an air cleaning function and move to the living room that is the target area, from among other robot devices, and transmit object data about immovable objects, which may include object data related to the position and structure of the living room, to the selected other robot device.

Figure 13:
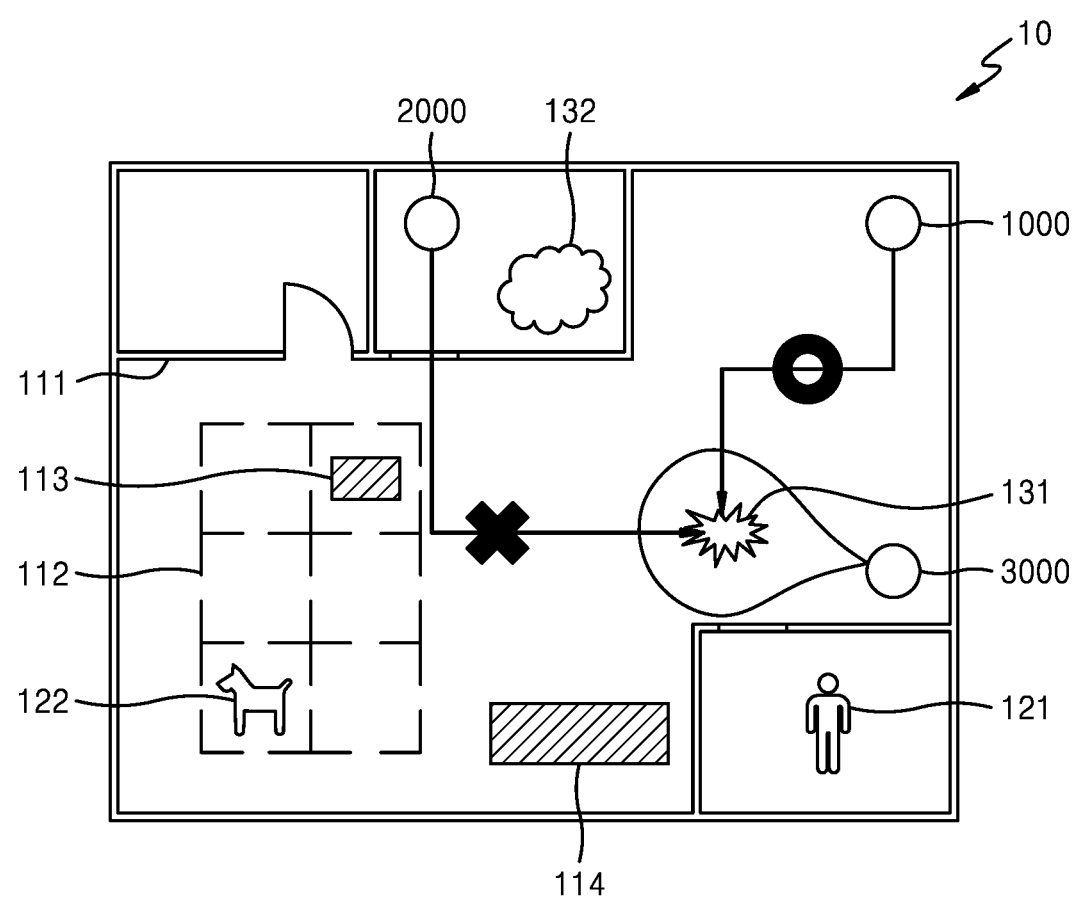
FIG. 13 is a diagram illustrating an example method, performed by a robot device, of sharing object data based on sensing data and a movable path of another robot device, according to various embodiments of the disclosure.

FIG. 13 is a diagram illustrating an example method, performed by a robot device, of sharing object data based on sensing data and a movable path of another robot device, according to various embodiments of the disclosure.

Referring to FIG. 13, the third robot device 3000 may execute air cleaning while executing a function in the living room. For example, the third robot device 3000 may analyze a voice input by a user, for example, "clean the living room," and determine air cleaning as a target function and the living room as a target area. The third robot device 3000 may directly recognize a gas contaminant in the air of the living room, for example, using a sensor included in the third robot device 3000 to determine air cleaning as a target function and the living room as a target area.

For example, to remove a gas contaminant, the third robot device 3000 may execute a function in the living room based on object data about immovable objects, which may include object data about the position and structure of the living room, and object data about a position of the gas contaminant.

For example, while moving and executing an air cleaning function in the living room, the third robot device 3000 may recognize a solid contaminant 131 existing in a particular area of the living room using a sensor included in the third robot device 3000. After removing the gas contaminant, the third robot device 3000 may transmit object data for removing the solid contaminant 131 of the living room, to another robot device. For example, to remove the solid contaminant 131 in the living room, the third robot device 3000 may transmit to another robot device able to execute a dust absorption function, for example, to one of the first robot device 1000 and the second robot device 2000, object data about immovable objects, which may include object data about the position and structure of the living room, and object data about a position of the solid contaminant 131.

The third robot device 3000 may determine a movable path of each of the first robot device 1000 and the second robot device 2000 based on the object data about immovable objects, which may include object data about the position and structure of the living room. The third robot device 3000 may determine that only the first robot device 1000 is able to move to the living room and execute a dust absorption function based on the object data about immovable objects, which may include object data about the position and structure of the living room, and object data about positions of the first robot device 1000 and the second robot device 2000.

For example, the third robot device 3000 may select the first robot device 1000 to move to the living room and execute a dust absorption function, and transmit, to the first robot device 1000 that is selected, the object data about immovable objects, which may include object data about the position and structure of the living room, and the object data about a position of the solid contaminant 131.

The first robot device 1000 that has received, from the third robot device 3000, the object data about immovable objects, which may include object data about the position and structure of the living room, and the object data about the position of the solid contaminant 131 may identify the position and structure of the living room based on the object data about immovable objects and identify the position of the solid contaminant 131 based on the object data about the position of the solid contaminant 131.

After identifying the position and structure of the living room and the position of the solid contaminant 131, the first robot device 1000 may move to the living room to execute a dust absorption function to remove the solid contaminant 131.

Figure 14A:
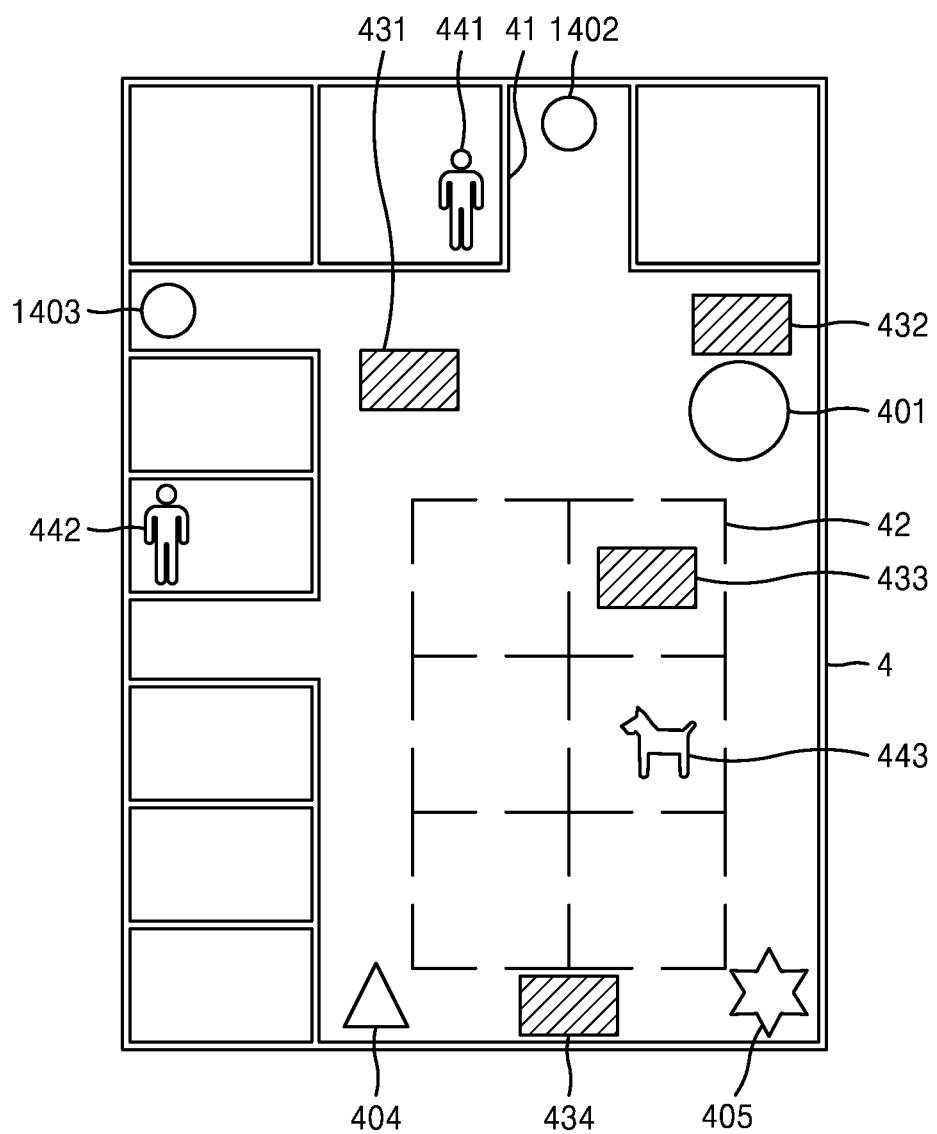
FIG. 14A is a diagram illustrating an example of sensing data obtained by a robot device, according to various embodiments of the disclosure.

FIG. 14A is a diagram illustrating an example of sensing data obtained by a robot device, according to various embodiments of the disclosure.

Referring to FIG. 14A, the first robot device 401, a second robot device 1402, a third robot device 1403, the fourth robot device 404, and the fifth robot device 405 may execute a function in a certain space of the office 4 where the plurality of rooms 41 and the movable wall 42 are installed and the first furniture 431, the second furniture 432, the third furniture 433, and the fourth furniture 434 are provided.

For example, the first robot device 401, the second robot device 1402, the third robot device 1403, the fourth robot device 404, and the fifth robot device 405 may execute functions in the certain space of the office 4 where the first user 441, the second user 442, and the first animal 443 stay or move in real time in a particular space.

The second robot device 1402 and the third robot device 1403 may be, for example, identical robot devices. The second robot device 1402 and the third robot device 1403 may be, for example, robot devices that perform an identical function and have same specifications.

The first robot device 401 may obtain sensing data about the plurality of rooms 41, the movable wall 42, the first furniture 431, the second furniture 432, the third furniture 433, the fourth furniture 434, the first user 441, the second user 442, and the first animal 443, for example, using a camera and a sensor in the first robot device 401.

The second through fifth robot devices 1402, 1403, 404, and 405 may also obtain sensing data about the plurality of rooms 41, the movable wall 42, the first furniture 431, the second furniture 432, the third furniture 433, the fourth furniture 434, the first user 441, the second user 442, and the first animal 443 using a camera and a sensor in each of the robot devices.

For example, the first robot device 401 may also obtain sensing data about the plurality of rooms 41, the movable wall 42, the first furniture 431, the second furniture 432, the third furniture 433, the fourth furniture 434, the first user 441, the second user 442, and the first animal 443, from another robot device, that is, at least one of robot devices, that is, the second robot device 1402, the third robot device 1403, the fourth robot device 404, or the fifth robot device 405.

Figure 14B:
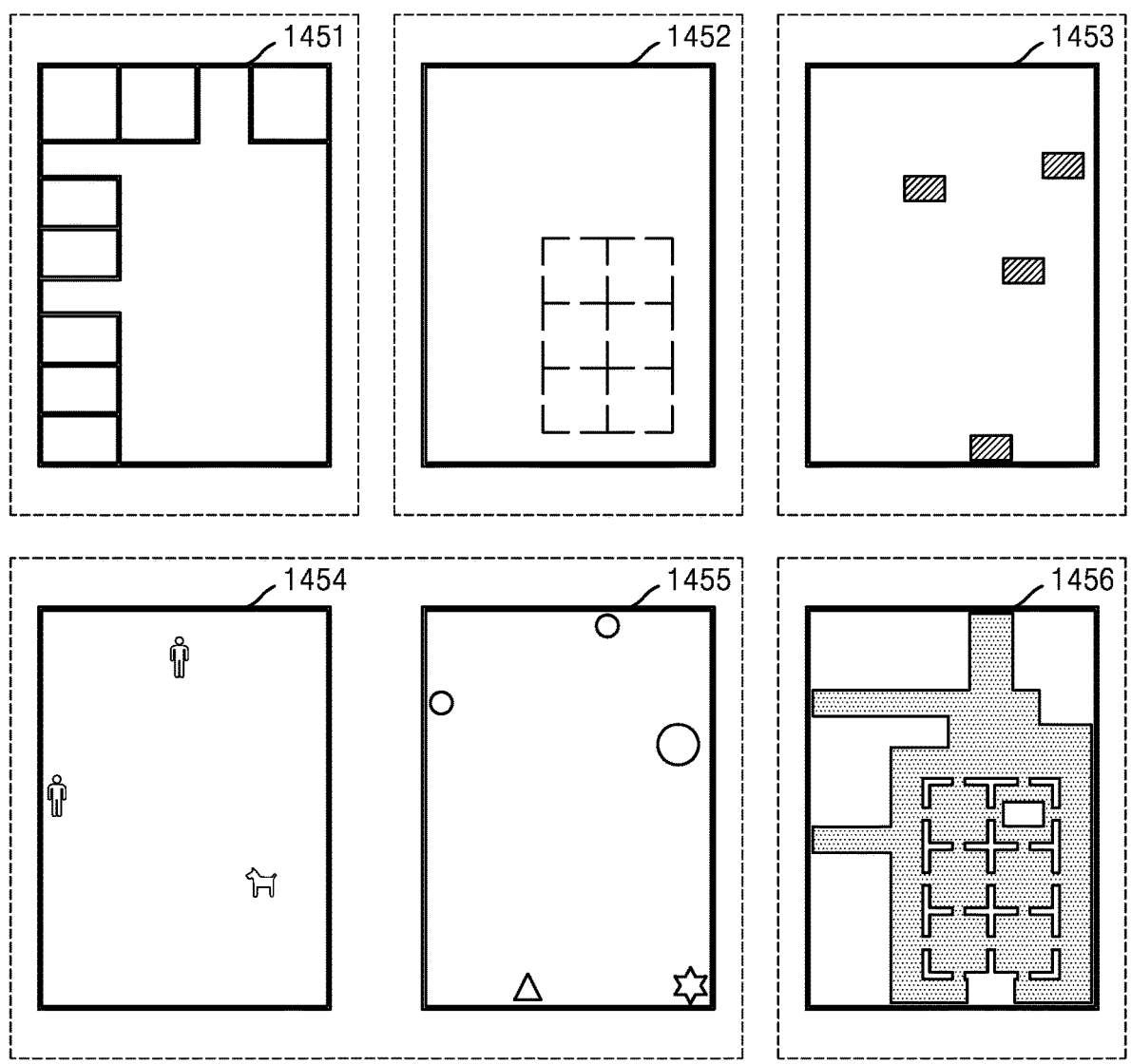
FIG. 14B is a diagram illustrating examples of data layers including a plurality of pieces of object data generated by a robot device by classifying sensing data, according to various embodiments of the disclosure.

FIG. 14B is a diagram illustrating examples of data layers including a plurality of pieces of object data generated by a robot device by classifying sensing data, according to various embodiments of the disclosure.

For example, the first robot device 401 may classify the obtained sensing data about the plurality of rooms 41, the movable wall 42, the first furniture 431, the second furniture 432, the third furniture 433, the fourth furniture 434, the first user 441, the second user 442, and the first animal 443, respectively into object data about the plurality of rooms 41, object data the movable wall 42, object data about the first furniture 431, the second furniture 432, the third furniture 433, and the fourth furniture 434, and object data about the first user 441, the second user 442, and the first animal 443.

Also, for example, the first robot device 401 may classify data about a position of the first robot device 401 and data about positions of other robot devices, that is, data about the positions of other robot devices received from at least one of the second robot device 1402, the third robot device 1403, the fourth robot device 404, or the fifth robot device 405, as separate object data.

For example, the first robot device 401 may also classify data about a movable region of the first robot device 401 as separate object data based on the obtained sensing data about the plurality of rooms 41, the movable wall 42, the first furniture 431, the second furniture 432, the third furniture 433, the fourth furniture 434, the first user 441, the second user 442, and the first animal 443 and characteristic information data of the first robot device 401.

For example, the first robot device 401 may classify data about movable regions of other robot devices as separate object data based on the obtained sensing data about the plurality of rooms 41, the movable wall 42, the first furniture 431, the second furniture 432, the third furniture 433, the fourth furniture 434, the first user 441, the second user 442, and the first animal 443 and characteristic information data of each of other robot devices, that is, the second robot device 1402, the third robot device 1403, the fourth robot device 404, and the fifth robot device 405.

The first robot device 401 may generate all object data about movable regions of the second robot device 1402 and the third robot device 1403 only based on characteristic information of the second robot device 1402, with respect to the second robot device 1402 and the third robot device 1403 that perform an identical function and have same specifications.

Referring to FIG. 14B, the plurality of data layers including a plurality of pieces of classified object data may be respectively used in generating a plurality of image layers 1451, 1452, 1453, 1454, 1455, and 1456 indicating positions of objects of a particular type on a map showing a certain space of the office 4.

For example, the first robot device 401 may generate an image layer 1451 about object data of the plurality of rooms 41, an image layer 1452 about object data of the movable wall 42, and an image layer 1453 about object data of the first furniture 431, the second furniture 432, the third furniture 433, and the fourth furniture 434.

The first robot device 401 may generate, for example, an image layer 1454 about object data of positions of the first user 441, the second user 442, and the first animal 443. The first robot device 401 may generate, for example, an image layer 1455 about object data of positions of the second robot device 1402, the third robot device 1403, the fourth robot device 404, and the fifth robot device 405.

The first robot device 401 may generate, for example, an image layer 1456 about object data of a movable region of the first robot device 401.

The first robot device 401 may select at least one of a plurality of pieces of object data based on a preset data transmission period, and transmit the selected object data to another robot device.

For example, the object data about the plurality of rooms 41 may be data about a structure and position of the plurality of rooms 41, and as the positions and form of walls of the plurality of rooms 41 hardly change, a frequency of change in the object data about the plurality of rooms 41 is the lowest from among all objects provided in the certain space of the office 4.

The object data about the movable wall 42 may include data about a structure and position of the movable wall 42, and the position and form of the movable wall 42 may be varied at a relatively high frequency compared to the plurality of rooms 41.

The object data about the first furniture 431, the second furniture 432, the third furniture 433, and the fourth furniture 434 may include data about positions of the first furniture 431, the second furniture 432, the third furniture 433, and the fourth furniture 434, and a position and form of each piece of furniture may vary at a higher frequency than the movable wall 42.

The object data about the first user 441, the second user 442, and the first animal 443 may include data about positions of the first user 441, the second user 442, and the first animal 443, and a frequency of changes in the object data about the first user 441, the second user 442, and the first animal 443 is highest from among all objects provided in the certain space of the office 4.

The first robot device 401 may provide the object data about the plurality of rooms 41 to another robot device, that is, at least one of the second robot device 1402, the third robot device 1403, the fourth robot device 404, or the fifth robot device 405, according to a preset data transmission period.

For example, the first robot device 401 may transmit the object data about the plurality of rooms 41, which has a lowest change frequency from among all objects provided in the certain space of the office 4, to all the other robot devices according to a preset first period. The preset first period may be, for example, transmitting object data only once after all robot devices are arranged.

The first robot device 401 may provide object data about the movable wall 42, to another robot device, that is, at least one of the second robot device 1402, the third robot device 1403, the fourth robot device 404, or the fifth robot device 405 according to a preset data transmission period.

The first robot device 401 may transmit, for example, the object data about the movable wall 42 to all the other robot devices according to a preset second period. The preset second period may be, for example, transmitting the object data about the movable wall 42 to at least one of the other robot devices only one time at each start of an operation of the first robot device 401.

The first robot device 401 may provide the object data about the first furniture 431, the second furniture 432, the third furniture 433, and the fourth furniture 434, to another robot device, that is, at least one of the second robot device 1402, the third robot device 1403, the fourth robot device 404, or the fifth robot device 405 according to a preset data transmission period.

For example, the first robot device 401 may transmit the object data about the first furniture 431, the second furniture 432, the third furniture 433, and the fourth furniture 434 to all the other robot devices according to a preset third period.

In addition, for example, the first robot device 401 may store the object data about the first furniture 431, the second furniture 432, the third furniture 433, and the fourth furniture 434 in a memory included in the first robot device 401 every preset third period to update the object data about the first furniture 431, the second furniture 432, the third furniture 433, and the fourth furniture 434.

The first robot device 401 may provide the object data about the first user 441, the second user 442, and the first animal 443, to another robot device, that is, at least one of the second robot device 1402, the third robot device 1403, the fourth robot device 404, or the fifth robot device 405 according to a preset data transmission period.

For example, the first robot device 401 may transmit the object data about the first furniture 431, the second furniture 432, the third furniture 433, and the fourth furniture 434 to all the other robot devices every preset fourth period.

In addition, the first robot device 401 may store the object data about the first user 441, the second user 442, and the first animal 443 in a memory included in the first robot device 401 every preset fourth period to update the object data about the first user 441, the second user 442, and the first animal 443.

According, for example, to a preset data transmission period, the first robot device 401 may provide object data about positions of all robot devices, for example, the first robot device 401, the second robot device 1402, the third robot device 1403, the fourth robot device 404, and the fifth robot device 405, to another robot device, that is, to at least one of the second robot device 1402, the third robot device 1403, the fourth robot device 404, or the fifth robot device 405. For example, the first robot device 401 may transmit the object data about positions of all robot devices to all the other robot devices every preset fifth period.

According, for example, to a preset data transmission period, the first robot device 401 may provide the object data about a movable region of the first robot device 401, to another robot device, that is, at least one of the second robot device 1402, the third robot device 1403, the fourth robot device 404, or the fifth robot device 405.

For example, when the object data about a movable region of the first robot device 401 is identical to object data about movable regions of the second robot device 1402, the third robot device 1403, and the fourth robot device 404, the first robot device 401 may transmit the object data about a movable region of the first robot device 401 to the second robot device 1402, the third robot device 1403, and the fourth robot device 404 according to a preset data transmission period.

For example, the first robot device 401 may transmit the object data about a movable region of the first robot device 401 to the second robot device 1402, the third robot device 1403, and the fourth robot device 404 every preset sixth period.

Without the need to generate object data about movable regions by directly obtaining and classifying sensing data, the second robot device 1402, the third robot device 1403, and the fourth robot device 404 may execute functions using the object data about a movable region of the first robot device 401, received from the first robot device 401.

When, for example, the object data about a movable region of the first robot device 401 is not identical to object data about a movable region of the fifth robot device 405, the first robot device 401 may not transmit the object data about a movable region of the first robot device 401 to the fifth robot device 405.

For example, the fifth robot device 405 may not receive the object data about a movable region of the first robot device 401 from the first robot device 401, but may execute a function using object data about a movable region of the fifth robot device 405, the object data about the movable region of the fifth robot device 405 being generated by directly obtaining and classifying sensing data, by the fifth robot device 405.

The first robot device 401 may transmit, according to the preset first period, the object data about the plurality of rooms 41 to all the other robot devices only once after arrangement of all of the robot devices, and may transmit, according to the preset second period, the object data about the movable wall 42 to all the other robot devices only once at each start of an operation of the first robot device 401.

In addition, the first robot device 401 may transmit, for example, the object data about the first furniture 431, the second furniture 432, the third furniture 433, and the fourth furniture 434 to all the other robot devices according to the preset third period. The preset third period may have a higher data transmission frequency than, for example, the first period and the second period, and may have a lower data transmission frequency than the fourth period and the fifth period.

In addition, the first robot device 401 may transmit, for example, the object data about the first user 441, the second user 442, and the first animal 443 to all the other robot devices every preset fourth period. The preset fourth period may have a higher data transmission frequency than, for example, the first through third periods, and may have an equal data transmission frequency to the fifth period.

In addition, the first robot device 401 may transmit, for example, the object data about the positions of all robot devices to all the other robot devices every preset fifth period. The preset fifth period may have a higher data transmission frequency than, for example, the first through third periods, and may have an equal data transmission frequency to the fourth period.

The first robot device 401 may transmit, according to a preset sixth period, the object data about a movable region of the first robot device 401 to the second robot device 1402, the third robot device 1403, and the fourth robot device 404 which may use the same object data as the object data about a movable region of the first robot device 401.

The preset sixth period may be, for example, transmitting the object data about a movable region of the first robot device 401 to the second robot device 1402, the third robot device 1403, and the fourth robot device 404, when there is a change in at least one of the object data about the first furniture 431, the second furniture 432, the third furniture 433, and the fourth furniture 434, the object data about the first user 441, the second user 442, and the first animal 443, or the object data about the positions of all of the robot devices.

With respect to the second robot device 1402 and the third robot device 1403 performing an identical function and having same specifications, the first robot device 401 may transmit selected object data to only one of the two robot devices.

For example, the first robot device 401 may transmit object data only to the second robot device 1402 from among the second robot device 1402 and the third robot device 1403 performing an identical function and having same specifications. For example, the second robot device 1402 may share, with the third robot device 1403, object data received from the first robot device 401.

For example, the second robot device 1402 may share object data received from the first robot device 401, with the third robot device 1403 according to a preset data sharing period. In addition, for example, at the same time when receiving object data from the first robot device 401, the second robot device 1402 may share, with the third robot device 1403, in real time, the object data received from the first robot device 401.

Figure 15A:
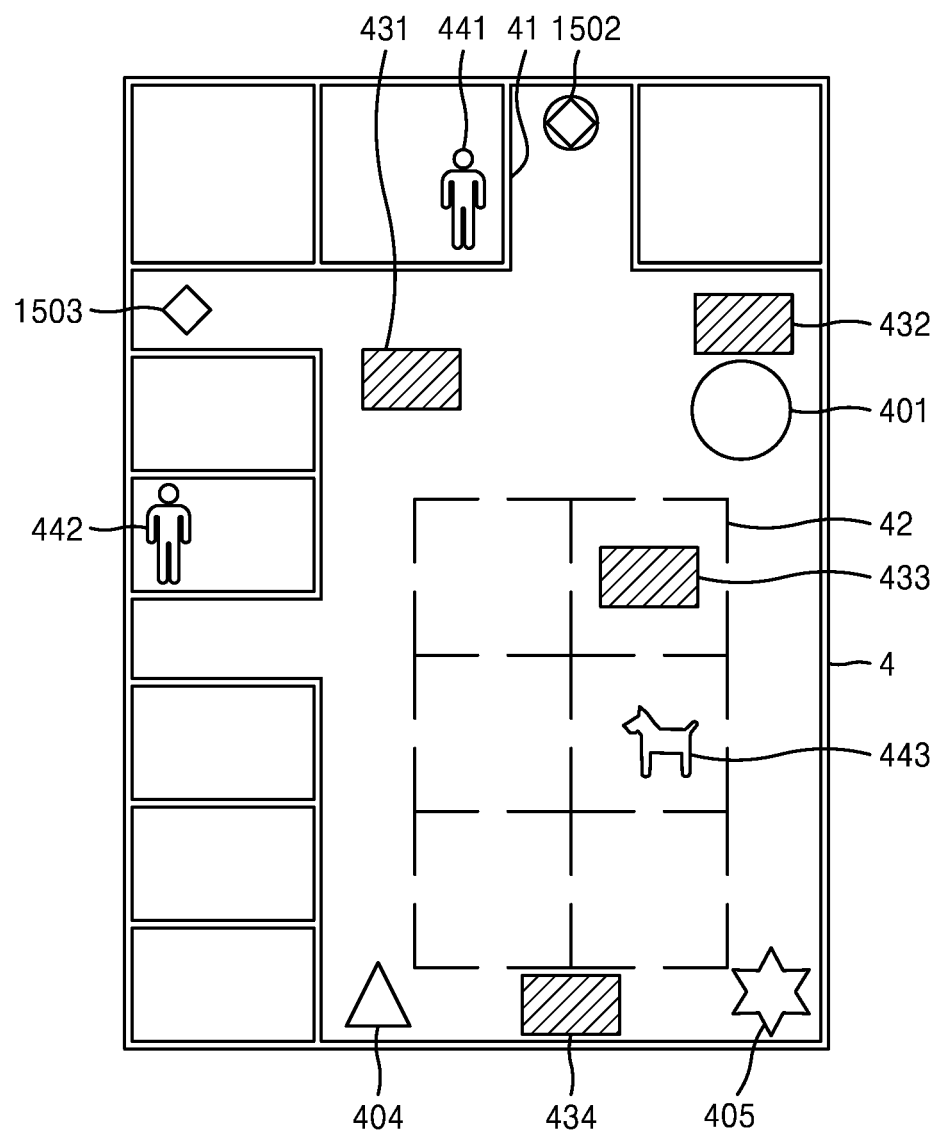
FIG. 15A is a diagram illustrating an example of sensing data obtained by a robot device, according to various embodiments of the disclosure.

FIG. 15A is a diagram illustrating an example of sensing data obtained by a robot device, according to various embodiments of the disclosure.

Referring to FIG. 15A, the first robot device 401, a second robot device 1502, a third robot device 1503, the fourth robot device 404, and the fifth robot device 405 may perform functions in a certain space of the office 4 where the plurality of rooms 41 and the movable wall 42 are installed and the first furniture 431, the second furniture 432, the third furniture 433, and the fourth furniture 434 are provided.

The first robot device 401, the second robot device 1502, the third robot device 1503, the fourth robot device 404, and the fifth robot device 405 may execute functions in the certain space of the office 4 where the first user 441, the second user 442, and the first animal 443 stay or move in real time in a particular space.

The second robot device 1502 may be, for example, a premium robot device. The third robot device 1503 may be, for example, a basic robot device. The premium robot device may include, for example, all executable functions as those of the basic robot device and may include all movable regions of the basic robot device.

The first robot device 401 may obtain sensing data about the plurality of rooms 41, the movable wall 42, the first furniture 431, the second furniture 432, the third furniture 433, the fourth furniture 434, the first user 441, the second user 442, and the first animal 443, for example, using a camera and a sensor in the first robot device 401.

The second through fifth robot devices 1502, 1503, 404, and 405 may also obtain sensing data about the plurality of rooms 41, the movable wall 42, the first furniture 431, the second furniture 432, the third furniture 433, the fourth furniture 434, the first user 441, the second user 442, and the first animal 443 using a camera and a sensor in each of the robot devices.

The first robot device 401 may also obtain sensing data about the plurality of rooms 41, the movable wall 42, the first furniture 431, the second furniture 432, the third furniture 433, the fourth furniture 434, the first user 441, the second user 442, and the first animal 443, from other robot devices, for example, at least one of the second robot device 1502, the third robot device 1503, the fourth robot device 404, or the fifth robot device 405.

Figure 15B:
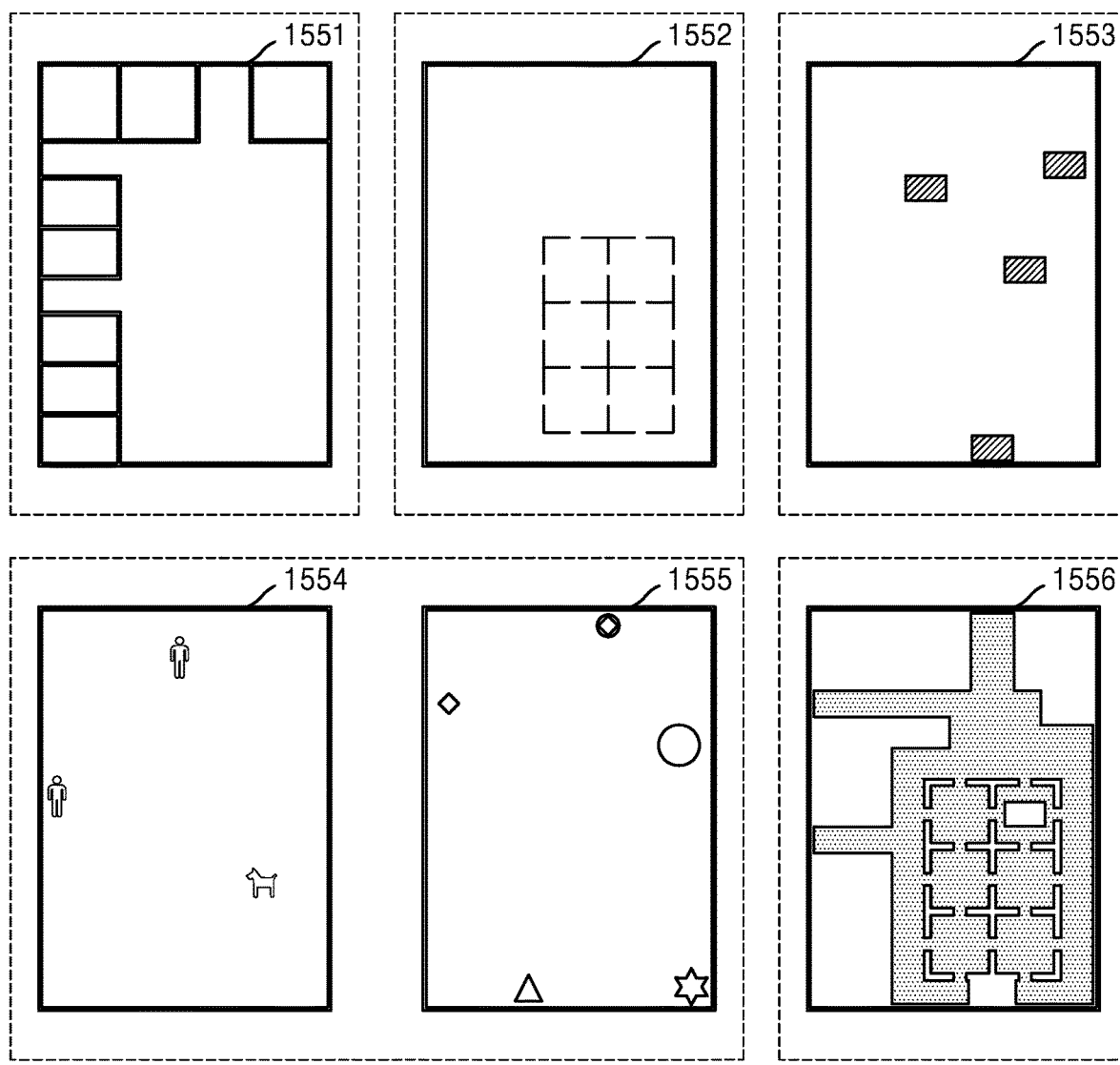
FIG. 15B is a diagram illustrating examples of data layers including a plurality of pieces of object data generated by a robot device by classifying sensing data, according to various embodiments of the disclosure.

FIG. 15B is a diagram illustrating examples of data layers including a plurality of pieces of object data generated by a robot device by classifying sensing data, according to various embodiments of the disclosure.

The first robot device 401 may classify the obtained sensing data about the plurality of rooms 41, the movable wall 42, the first furniture 431, the second furniture 432, the third furniture 433, the fourth furniture 434, the first user 441, the second user 442, and the first animal 443, respectively into object data about the plurality of rooms 41, object data the movable wall 42, object data about the first furniture 431, the second furniture 432, the third furniture 433, and the fourth furniture 434, and object data about the first user 441, the second user 442, and the first animal 443.

Also, for example, the first robot device 401 may classify data about a position of the first robot device 401 and data about positions of other robot devices, that is, data about the positions of other robot devices received from at least one of the second robot device 1502, the third robot device 1503, the fourth robot device 404, or the fifth robot device 405, as separate object data.

For example, the first robot device 401 may also classify data about a movable region of the first robot device 401 as separate object data based on the obtained sensing data about the plurality of rooms 41, the movable wall 42, the first furniture 431, the second furniture 432, the third furniture 433, the fourth furniture 434, the first user 441, the second user 442, and the first animal 443 and characteristic information data of the first robot device 401.

For example, the first robot device 401 may classify data about movable regions of other robot devices as separate object data based on the obtained sensing data about the plurality of rooms 41, the movable wall 42, the first furniture 431, the second furniture 432, the third furniture 433, the fourth furniture 434, the first user 441, the second user 442, and the first animal 443 and characteristic information data of each of other robot devices, that is, the second robot device 1502, the third robot device 1503, the fourth robot device 404, and the fifth robot device 405.

Referring to FIG. 15B, a plurality of data layers including a plurality of pieces of classified object data may be respectively used in generating a plurality of image layers 1551, 1552, 1553, 1554, 1555, and 1556 indicating positions of objects of a particular type on a map showing the certain space of the office 4.

The first robot device 401 may generate an image layer 1551 about object data of the plurality of rooms 41, an image layer 1552 about object data of the movable wall 42, and an image layer 1553 about object data of the first furniture 431, the second furniture 432, the third furniture 433, and the fourth furniture 434.

The first robot device 401 may generate, for example, an image layer 1554 about object data of positions of the first user 441, the second user 442, and the first animal 443. The first robot device 401 may generate, for example, an image layer 1555 about object data of positions of the second robot device 1502, the third robot device 1503, the fourth robot device 404, and the fifth robot device 405.

The first robot device 401 may generate, for example, an image layer 1556 about object data of a movable region of the first robot device 401.

The first robot device 401 may select at least one of a plurality of pieces of object data based on a preset data transmission period and transmit the selected object data to another robot device.

For example, the object data about the plurality of rooms 41 may be data about a structure and position of the plurality of rooms 41, and as the positions and form of walls of the plurality of rooms 41 hardly change, a frequency of change in the object data about the plurality of rooms 41 is the lowest from among all objects provided in the certain space of the office 4.

The object data about the movable wall 42 may include data about a structure and position of the movable wall 42, and the position and form of the movable wall 42 may be varied at a relatively high frequency compared to the plurality of rooms 41.

The object data about the first furniture 431, the second furniture 432, the third furniture 433, and the fourth furniture 434 may include data about positions of the first furniture 431, the second furniture 432, the third furniture 433, and the fourth furniture 434, and a position and form of each piece of furniture may vary at a higher frequency than the movable wall 42.

The object data about the first user 441, the second user 442, and the first animal 443 may include data about positions of the first user 441, the second user 442, and the first animal 443, and a frequency of changes in the object data about the first user 441, the second user 442, and the first animal 443 may be highest from among all objects in the certain space of the office 4.

The first robot device 401 may provide the object data about the plurality of rooms 41 to another robot device, that is, at least one of the second robot device 1502, the third robot device 1503, the fourth robot device 404, or the fifth robot device 405, according to a preset data transmission period.

For example, the first robot device 401 may transmit the object data about the plurality of rooms 41, which has a lowest change frequency from among all objects provided in the certain space of the office 4, to all the other robot devices according to a preset first period. The preset first period may be, for example, transmitting object data only once after all robot devices are arranged.

The first robot device 401 may provide the object data about the movable wall 42, to another robot device, that is, at least one of the second robot device 1502, the third robot device 1503, the fourth robot device 404, or the fifth robot device 405 according to a preset data transmission period.

The first robot device 401 may transmit, for example, the object data about the movable wall 42 to all the other robot devices according to a preset second period. The preset second period may be, for example, transmitting the object data about the movable wall 42 to at least one of the other robot devices only one time at each start of an operation of the first robot device 401.

The first robot device 401 may provide the object data about the first furniture 431, the second furniture 432, the third furniture 433, and the fourth furniture 434, to another robot device, for example, at least one of the second robot device 1502, the third robot device 1503, the fourth robot device 404, or the fifth robot device 405 according to a preset data transmission period.

The first robot device 401 may transmit, for example, the object data about the first furniture 431, the second furniture 432, the third furniture 433, and the fourth furniture 434 to all the other robot devices according to a preset third period.

In addition, for example, the first robot device 401 may store the object data about the first furniture 431, the second furniture 432, the third furniture 433, and the fourth furniture 434 in a memory included in the first robot device 401 every preset third period to update the object data about the first furniture 431, the second furniture 432, the third furniture 433, and the fourth furniture 434.

The first robot device 401 may provide the object data about the first user 441, the second user 442, and the first animal 443, to another robot device, that is, at least one of the second robot device 1502, the third robot device 1503, the fourth robot device 404, or the fifth robot device 405 according to a preset data transmission period.

For example, the first robot device 401 may transmit the object data about the first furniture 431, the second furniture 432, the third furniture 433, and the fourth furniture 434 to all the other robot devices every preset fourth period.

In addition, the first robot device 401 may store the object data about the first user 441, the second user 442, and the first animal 443 in a memory included in the first robot device 401 every preset fourth period to update the object data about the first user 441, the second user 442, and the first animal 443.

According to a preset data transmission period, the first robot device 401 may provide object data about positions of all robot devices, that is, the first robot device 401, the second robot device 1502, the third robot device 1503, the fourth robot device 404, and the fifth robot device 405, to another robot device, that is, to at least one of the second robot device 1502, the third robot device 1503, the fourth robot device 404, or the fifth robot device 405. For example, the first robot device 401 may transmit the object data about the positions of all robot devices to all the other robot devices every preset fifth period.

According, for example, to a preset data transmission period, the first robot device 401 may provide the object data about a movable region of the first robot device 401, to another robot device, that is, at least one of the second robot device 1502, the third robot device 1503, the fourth robot device 404, or the fifth robot device 405.

For example, when the object data about a movable region of the first robot device 401 is identical to object data about movable regions of the second robot device 1502, the third robot device 1503, and the fourth robot device 404, the first robot device 401 may transmit the object data about a movable region of the first robot device 401 to the second robot device 1502, the third robot device 1503, and the fourth robot device 404 according to a preset data transmission period.

For example, the first robot device 401 may transmit the object data about a movable region of the first robot device 401 to the second robot device 1502, the third robot device 1503, and the fourth robot device 404 every preset sixth period.

Without the need to generate object data about movable regions by directly obtaining and classifying sensing data, the second robot device 1502, the third robot device 1503, and the fourth robot device 404 may execute functions using the object data about a movable region of the first robot device 401, received from the first robot device 401.

When, for example, the object data about a movable region of the first robot device 401 is not identical to object data about a movable region of the fifth robot device 405, the first robot device 401 may not transmit the object data about a movable region of the first robot device 401 to the fifth robot device 405.

For example, the fifth robot device 405 may not receive the object data about a movable region of the first robot device 401 from the first robot device 401, but may execute a function using object data about a movable region of the fifth robot device 405, the object data about the movable region of the fifth robot device 405 being generated by directly obtaining and classifying sensing data, by the fifth robot device 405.

The first robot device 401 may transmit, according to the preset first period, the object data about the plurality of rooms 41 to all the other robot devices only once after arrangement of all of the robot devices, and may transmit, according to the preset second period, the object data about the movable wall 42 to all the other robot devices only once at each start of an operation of the first robot device 401.

In addition, the first robot device 401 may transmit, for example, the object data about the first furniture 431, the second furniture 432, the third furniture 433, and the fourth furniture 434 to all the other robot devices according to the preset third period. The preset third period may have a higher data transmission frequency than, for example, the first period and the second period, and may have a lower data transmission frequency than the fourth period and the fifth period.

In addition, for example, the first robot device 401 may transmit the object data about the first user 441, the second user 442, and the first animal 443 to all the other robot devices every preset fourth period. The preset fourth period may have a higher data transmission frequency than, for example, the first through third periods, and may have an equal data transmission frequency to the fifth period.

In addition, the first robot device 401 may transmit, for example, the object data about the positions of all robot devices to all the other robot devices every preset fifth period. The preset fifth period may have a higher data transmission frequency than, for example, the first through third periods, and may have an equal data transmission frequency to the fourth period.

The first robot device 401 may transmit, according to a preset sixth period, the object data about a movable region of the first robot device 401 to the second robot device 1502, the third robot device 1503, and the fourth robot device 404 which may use the same object data as the object data about a movable region of the first robot device 401.

The preset sixth period may be, for example, transmitting the object data about a movable region of the first robot device 401 to the second robot device 1502, the third robot device 1503, and the fourth robot device 404, when there is a change in at least one of the object data about the first furniture 431, the second furniture 432, the third furniture 433, and the fourth furniture 434, the object data about the first user 441, the second user 442, and the first animal 443, or the object data about the positions of all of the robot devices.

With respect to the second robot device 1502 and the third robot device 1503, the first robot device 401 may transmit object data to only to the second robot device 1502 which may be a premium robot device. For example, the second robot device 1502 may share a portion of the object data that may be used by the third robot device 1503, with the third robot device 1503, from among the object data received from the first robot device 401. For example, the second robot device 1502 may share a portion of the object data received from the first robot device 401, with the third robot device 1503 according to a preset data sharing period. In addition, for example, at the same time when receiving object data from the first robot device 401, the second robot device 1502 may share, with the third robot device 1503, in real time, the object data received from the first robot device 401.

In the above-described example embodiment of the disclosure, the first through sixth periods are described as being preset, and each period is described as being set based on a frequency of changes in positions of objects related to each piece of object data, but the periods are not limited thereto. Any period and any method of setting the period that increase a transmission and reception efficiency of object data during operation of each robot device through sharing of object data may be used. A data transmission and reception efficiency may refer to at least one of an amount of data being transmitted or received or power used in data transmission and reception.

For example, the first through sixth periods may also be determined based on an average frequency of changes in each piece of object data, calculated at a time when object data corresponding to a certain data capacity is stored in a memory, as object data is continuously generated and stored through obtaining and classifying sensing data.

In addition, for example, the first through sixth periods may also be determined based on an average frequency of changes in each piece of object data, calculated at a time when object data is transmitted a certain number of times, as object data is continuously generated and stored through obtaining and classifying sensing data.

Figure 16:
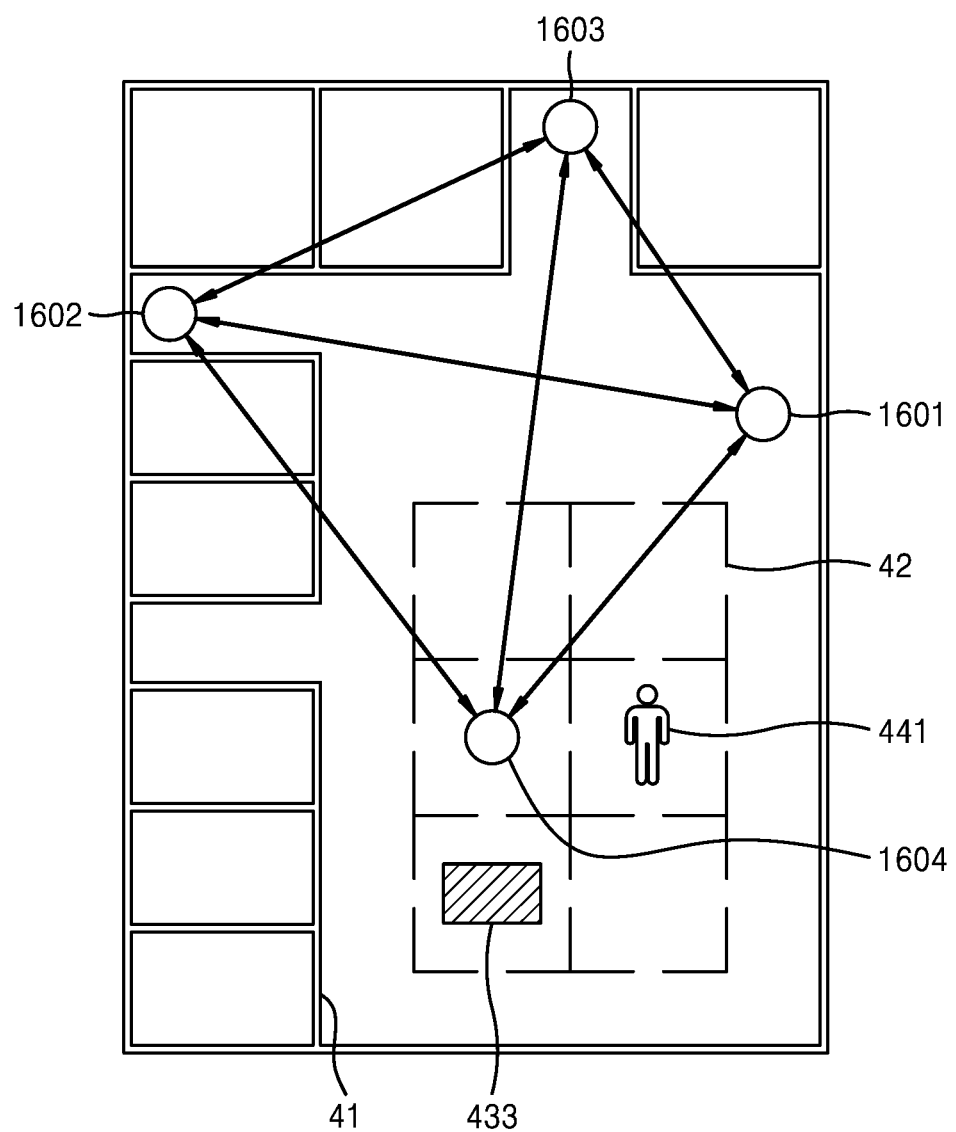
FIG. 16 is a diagram illustrating an example of a connection relationship among robot devices sharing object data, according to various embodiments of the disclosure.

FIG. 16 is a diagram illustrating an example of a connection relationship among robot devices sharing object data, according to various embodiments of the disclosure.

Referring to FIG. 16, a first robot device 1601, a second robot device 1602, a third robot device 1603, and a fourth robot device 1604 may share sensing data and object data with one another. For example, the first robot device 1601, the second robot device 1602, the third robot device 1603, and the fourth robot device 1604 may transmit or receive object data to or from one another.

Referring to FIG. 16, the first robot device 1601, the second robot device 1602, the third robot device 1603, and the fourth robot device 1604 may execute a function in the certain space of the office 4 where the plurality of rooms 41 and the movable wall 42 are installed and the first furniture 431, the second furniture 432, the third furniture 433, and the fourth furniture 434 are provided.

For example, the first robot device 1601, the second robot device 1602, the third robot device 1603, and the fourth robot device 1604, may execute functions in the certain space of the office 4 where the first user 441, the second user 442, and the first animal 443 stay or move in real time in a particular space.

For example, each of the first robot device 1601, the second robot device 1602, the third robot device 1603, and the fourth robot device 1604 may also obtain sensing data about the plurality of rooms 41, the movable wall 42, the first furniture 431, the second furniture 432, the third furniture 433, the fourth furniture 434, the first user 441, the second user 442, and the first animal 443, using a camera and a sensor in each robot device.

The first robot device 1601 may receive, for example, from at least one of the second robot device 1602, the third robot device 1603, or the fourth robot device 1604, object data about the plurality of rooms 41, the movable wall 42, the first furniture 431, the second furniture 432, the third furniture 433, the fourth furniture 434, the first user 441, the second user 442, and the first animal 443.

Likewise, the second robot device 1602 may receive, for example, from at least one of the first robot device 1601, the third robot device 1603, or the fourth robot device 1604, object data about the plurality of rooms 41, the movable wall 42, the first furniture 431, the second furniture 432, the third furniture 433, the fourth furniture 434, the first user 441, the second user 442, and the first animal 443.

The third robot device 1603 and the fourth robot device 1604 may also receive, from at least one robot device other than by itself, object data about the plurality of rooms 41, the movable wall 42, the first furniture 431, the second furniture 432, the third furniture 433, the fourth furniture 434, the first user 441, the second user 442, and the first animal 443.

Figure 17:
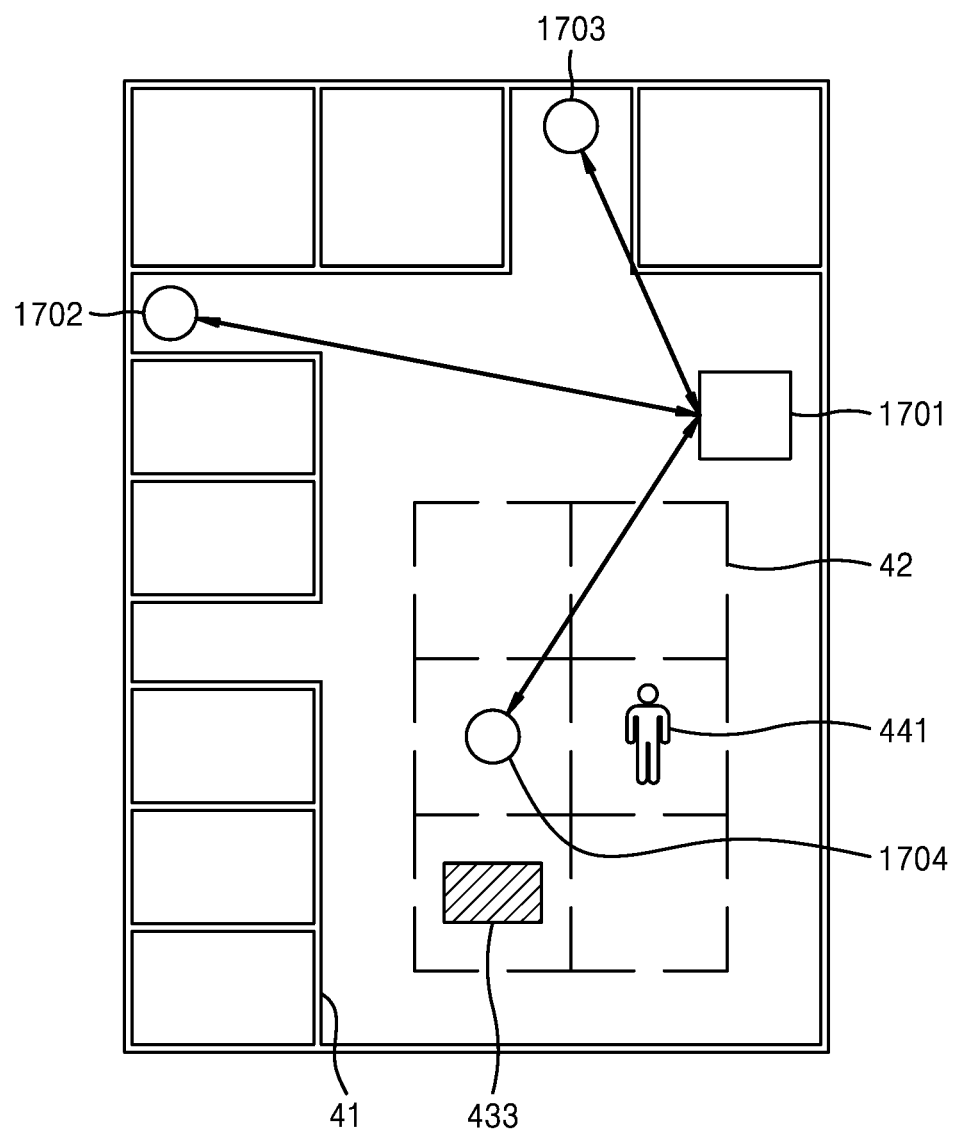
FIG. 17 is a diagram illustrating an example of a connection relationship among robot devices sharing object data, according to various embodiments of the disclosure.

FIG. 17 is a diagram illustrating an example of a connection relationship among robot devices sharing object data, according to some embodiments of the disclosure.

Referring to FIG. 17, a second robot device 1702, a third robot device 1703, and a fourth robot device 1704 may share sensing data and object data with a first robot device 1701. For example, the second robot device 1702, the third robot device 1703, and the fourth robot device 1704 may transmit or receive object data only to or from the first robot device 1701.

For example, the first robot device 1701 may not perform a function by itself, but may be just a hub device that performs only transmission or reception of sensing data or object data with the second robot device 1702, the third robot device 1703, and the fourth robot device 1704.

Referring to FIG. 17, the second robot device 1702, the third robot device 1703, and the fourth robot device 1704 may execute a function in the certain space of the office 4 where the plurality of rooms 41 and the movable wall 42 are installed and the first furniture 431, the second furniture 432, the third furniture 433, and the fourth furniture 434 are provided.

For example, the second robot device 1702, the third robot device 1703, and the fourth robot device 1704 may execute functions in the certain space of the office 4 where the first user 441, the second user 442, and the first animal 443 stay or move in real time in a particular space.

For example, each of the second robot device 1702, the third robot device 1703, and the fourth robot device 1704 may obtain sensing data about the plurality of rooms 41, the movable wall 42, the first furniture 431, the second furniture 432, the third furniture 433, the fourth furniture 434, the first user 441, the second user 442, and the first animal 443, using a camera and a sensor in each robot device.

The first robot device 1701 may act as an intermediary for data transmission or reception among the second robot device 1702, the third robot device 1703, and the fourth robot device 1704.

The first robot device 1701 may receive, for example, from at least one of the second robot device 1702, the third robot device 1703, or the fourth robot device 1704, object data about the plurality of rooms 41, the movable wall 42, the first furniture 431, the second furniture 432, the third furniture 433, the fourth furniture 434, the first user 441, the second user 442, and the first animal 443.

The first robot device 1701 may transmit, for example, to at least one of the second robot device 1702, the third robot device 1703, or the fourth robot device 1704, object data received from at least one of the second robot device 1702, the third robot device 1703, or the fourth robot device 1704.

Figure 18:
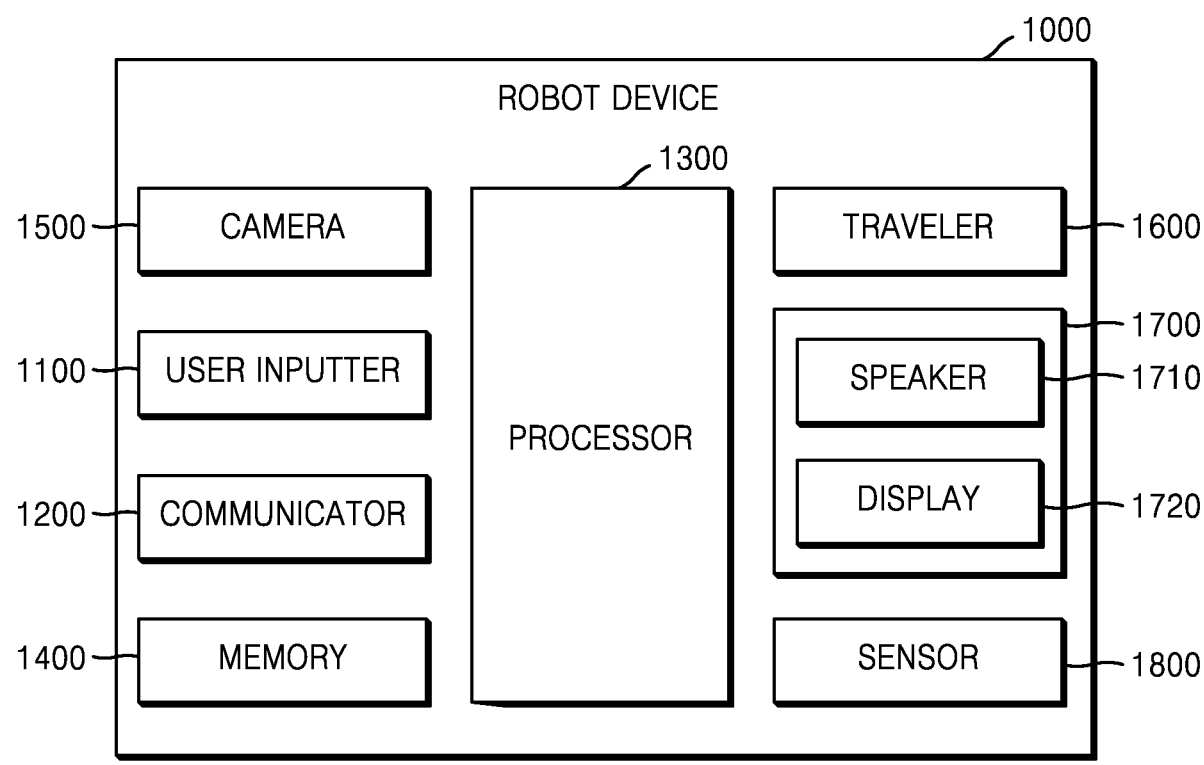
FIG. 18 is a block diagram illustrating an example of a robot device according to various embodiments of the disclosure.

FIG. 18 is a block diagram illustrating an example robot device according to various embodiments of the disclosure.

Referring to FIG. 18, a robot device 1000 according to various embodiments of the disclosure may include a user inputter (e.g., including input circuitry) 1100, a communicator (e.g., including communication circuitry) 1200, a memory 1400, a camera 1500, a traveler (e.g., including a drive motor) 1600, an outputter (e.g., including output circuitry) 1700, a sensor 1800, and a processor (e.g., including processing circuitry) 1300, and the outputter 1700 may include a speaker 1710 and a display 1720.

The user inputter 1100 may include various input circuitry and receive a user input of controlling operation of the robot device 1000. For example, the user inputter 1100 may include various input circuitry including, for example, and without limitation, a keypad, a microphone, a dome switch, a touchpad (e.g., a touch capacitive type touch pad, a pressure resistive type touch pad, an infrared beam sensing type touch pad, a surface ultrasonic wave conduction type touch pad, an integral strain gauge type touch pad, a piezo-effect type touch pad, etc.), a jog wheel, a jog switch, and the like, but is not limited thereto.

The communicator 1200 may include various communication circuitry included in one or more communication modules for communication with the second robot device 2000 and the third robot device 3000. For example, the communicator 1200 may include various communicators including various communication circuitry, such as, for example, and without limitation, a short-range wireless communicator, a mobile communicator, or the like. The short-range wireless communicator may include a Bluetooth communicator, a Bluetooth Low Energy (BLE) communicator, a Near Field communicator, a WLAN (WiFi) communicator, a Zigbee communicator, an Infrared Data Association (IrDA) communicator, a Wi-Fi Direct (WFD) communicator, a ultra-wideband (UWB) communicator, and an Ant+ communicator, but is not limited thereto. The mobile communicator may transmit or receive a wireless signal to or from at least one of a base station on a mobile communication network, an external terminal, or a server. A wireless signal may include a voice call signal, a video telephony call signal or various types of data according to transmission or reception of text or multimedia messages.

The memory 1400 may store a program for controlling operation of the robot device 1000. The memory 1400 may include at least one instruction for controlling operation of the robot device 1000. In addition, the memory 1400 may store, for example, obtained sensing data and generated object data. The memory 1400 may store, for example, a training model for determining a target area, a training model for generating object data, or the like. Programs stored in the memory 1400 may be classified into a plurality of modules according to their functions.

The memory 1400 may include at least one type of storage medium selected from a flash memory type storage medium, a hard disk type storage medium, a multimedia card micro type storage medium, a card type memory (e.g., Secure Digital (SD) or extreme Digital (xD) memory), a random access memory (RAM), a static random access memory (SRAM), a read-only memory (ROM), an electrically erasable programmable read-only memory (EEPROM), a programmable read-only memory (PROM), a magnetic memory, a magnetic disc, or an optical disc.

The camera 1500 may capture an image of the surroundings of the robot device 1000. While the robot device 1000 is executing a function, the camera 1500 may capture an image of the surroundings or the floor of the robot device 1000 in real time.

The traveler 1600 may include at least one driving wheel for moving the robot device 1000. The traveler 1600 may include a driving motor connected to a driving wheel to rotate the driving wheel. The driving wheel may include a left wheel and a right wheel respectively provided at the left and right sides of a main body of the robot device 1000. The left wheel and the right wheel may be driven via a single driving motor, or a left wheel driving motor driving the left wheel and a right wheel driving motor driving the right wheel may be respectively provided according to necessity. In this case, by differentiating rotational speeds of the left wheel and the right wheel, a travelling direction of the robot device 1000 may be switched to the left or the right.

The outputter 1700 may include various output circuitry and output an audio signal or a video signal. The outputter 1700 may include various output circuitry, including, for example, and without limitation, a speaker 1710 and a display 1720. The speaker 1710 may output audio data received from the communicator 1200 or stored in the memory 1400. The speaker 1710 may output a sound signal related to a function performed in the robot device 1000 (for example, a call signal receiving sound, a message receiving sound, an alarm sound).

The display 1720 outputs and displays information processed using the robot device 1000. For example, the display 1720 may display a user interface for controlling the robot device 1000, a user interface for displaying a status of the robot device 1000, or the like. In addition, for example, the display 1720 may selectively display an image layer generated based on a plurality of data layers.

When the display 1720 and a touch pad are in a layered structure to form a touch screen, the display 1720 may also be used as an input device as well as an output device.

The sensor 1800 may include at least one sensor for sensing data related to an operation and state of the robot device 1000 and sensing data about contamination of a certain space. The sensor 1800 may include, for example, and without limitation, at least one of an infrared sensor, an ultrasonic sensor, a radio frequency (RF) sensor, a geomagnetic sensor, a position sensitive device (PSD), or the like.

The sensor 1800 may sense a contaminated area around the robot device 1000 and a degree of the contamination. In addition, the sensor 1800 may sense an obstacle around the robot device 1000 or whether there is a cliff around the robot device 1000.

In addition, the sensor 1800 may further include an operation detecting sensor sensing an operation of the robot device 1000. For example, the sensor 1800 may include, without limitation, a gyro sensor, a wheel sensor, an acceleration sensor, or the like.

A gyro sensor may sense a rotational direction and detect a rotational angle thereof when the robot device 1000 is moving. A wheel sensor may be connected to the left wheel and right wheel to sense a number of revolutions of the wheels. For example, the wheel sensor may be a rotary encoder, but is not limited thereto.

The processor 1300 may include various processing circuitry and may typically control an overall operation of the robot device 1000. For example, the processor 1300 may execute programs stored in the memory 1400 to thereby control the user inputter 1100, the communicator 1200, the memory 1400, the camera 1500, the traveler 1600, the outputter 1700, and the sensor 1800. The processor 1300 may control operation of the robot device 1000 by controlling the user inputter 1100, the communicator 1200, the memory 1400, the camera 1500, the traveller 1600, the outputter 1700, and the sensor 1800.

The processor 1300 may control the robot device to obtain sensing data related to objects in a certain space. The processor 1300 may generate sensing data by sensing objects including at least two of a person, an animal, an immovable object, and a movable object using a camera and a sensor in the robot device 1000.

The processor 1300 may classify the obtained sensing data into a plurality of pieces of object data based on properties of the objects. The processor 1300 may classify the obtained sensing data into a plurality of pieces of object data according to types of objects. The processor 1300 may classify data into a plurality of pieces of object data and generate a plurality of data layers including the classified plurality of pieces of object data.

The data layers may be used in generating an image layer indicating positions of objects of a particular type on a map showing certain space. An image layer indicating the positions of the objects of the particular type may be displayed on the display 1720 while the robot device 1000 is executing a function in a certain target area. The image layer indicating the positions of the objects of the particular type may be selectively displayed on the display 1720 based on, for example, a progress status of execution of a function with respect to a target area.

The processor 1300 may generate a data layer indicating a movable region of the robot device 1000 in the certain space based on sensing data.

The processor 1300 may select another robot device from among at least one other robot device. The processor 1300 may select another at least one robot device from among the second robot device 2000 and the third robot device 3000 based on at least one of positions of the second robot device 2000 and the third robot device 3000 or a position of a target area. The processor 1300 may select another at least one robot device based on functions of the second robot device 2000 and the third robot device 3000 and a contamination state of a target area. The processor 1300 may select another at least one robot device based on sensing data and movable paths of the second robot device 2000 and the third robot device 3000. For example, the processor 1300 may receive a voice input by a user, input via the user inputter 1100, and determine a target area by analyzing the received voice input.

The processor 1300 may select object data to be provided to the selected robot device from among the classified plurality of pieces of object data. The processor 1300 may select at least one piece of object data from among a plurality of pieces of object data based on a preset data transmission period. The preset data transmission period may be determined based on, for example, a frequency of changes in a plurality of pieces of object data. The processor 1300 may select at least one piece of object data from among the classified plurality of pieces of object data based on performance of other robot devices.

The processor 1300 may transmit the selected object data to the selected other robot device.

Various embodiments of the disclosure may be implemented in a form of a recording medium including instructions executable by a computer, such as a program module executed by a computer. A computer-readable recording medium may be an arbitrary available medium accessible by a computer, and may be any one of volatile, nonvolatile, separable, and non-separable media. Also, examples of the computer-readable recording medium may include a computer storage medium. Examples of the computer storage medium include volatile, nonvolatile, separable, and non-separable media realized by an arbitrary method or technology for storing information about a computer-readable instruction, a data structure, a program module, or other data.

In addition, in the present specification, terms such as a " . . . unit" may refer to a hardware component such as a processor or a circuit and/or a software component executed by a hardware component such as a processor.

According to the disclosure, a robot device capable of classifying sensing data about objects in a certain space, into a plurality of pieces of object data, according to types of the objects and selectively sharing the classified object data with other robot devices, and an object data sharing method may be provided.

Also, according to the disclosure, a robot device capable of selecting another robot device, with which to share sensing data based on a target area determined according to a voice command by a user, and an object data sharing method may be provided.

The various example embodiments of the disclosure described above are only examples, and it will be understood by those of ordinary skill in the art that various changes in form and details may be made therein without departing from the spirit and scope of the disclosure, including the appended claims. The example embodiments of the disclosure should be considered in a descriptive sense only and not for purposes of limitation. For example, each element described as a single type may be distributed, and similarly, elements described to be distributed may be combined.

The scope of the disclosure is defined not by the detailed description of the disclosure and includes the appended claims, and all differences within the scope will be understood as being included in the disclosure.

What is claimed is:

1. A method, performed by a robot device, of sharing object data, the method comprising:
    obtaining sensing data related to objects in a certain space;
    classifying the obtained sensing data into a plurality of pieces of object data based on properties of the objects;
    selecting another robot device from among at least one other robot device;
    selecting object data to be provided to the selected robot device from among the classified plurality of pieces of object data; and
    transmitting the selected object data to the selected robot device,
    wherein the classifying of the obtained sensing data into the plurality of pieces of object data comprises generating a plurality of data layers including the classified plurality of pieces of object data,
    wherein the classifying of the obtained sensing data into the plurality of pieces of object data comprises classifying the obtained sensing data into the plurality of pieces of object data based on types of the objects,
    wherein a data layer is used in generating an image layer indicating positions of objects of a particular type on a map of the certain space, and
    wherein the image layer indicating the positions of the objects of the particular type is displayed on a display connected to the robot device while the robot device is executing a function in a certain target area.

2. The method of claim 1, wherein the obtaining of the sensing data related to the objects in the certain space comprises obtaining the sensing data by sensing the objects, the objects comprising at least two of a person, an animal, an immovable object, or a movable object.

3. The method of claim 1, wherein the image layer indicating the positions of the objects of the particular type is selectively displayed on the display based on a progress status of execution of the function with respect to the certain target area.

4. The method of claim 1, further comprising generating a data layer indicating a movable region of the robot device in the certain space based on the sensing data.

5. The method of claim 1, wherein the selecting of another robot device from among the at least one other robot device comprises selecting another robot device based on at least one of a position of the other robot device or a position of the target area.

6. The method of claim 1, wherein the selecting of another robot device from among the at least one other robot device comprises selecting another robot device based on a function of the other robot device and a contamination state of the target area.

7. The method of claim 1, wherein the selecting of another robot device from among the at least one other robot device comprises selecting the other robot device based on the sensing data and a movable path of the other robot device.

8. The method of claim 1, wherein the selecting of another robot device from among the at least one other robot device comprises selecting another robot device that has requested the robot device to transmit the object data from among the at least one other robot device.

9. The method of claim 1, wherein the selecting of object data to be provided to the selected robot device, from among the classified plurality of pieces of object data, comprises selecting at least one piece of object data from among the plurality of pieces of object data based on a preset data transmission period.

10. The method of claim 9, wherein the preset data transmission period is determined based on a frequency of changes in the plurality of pieces of object data.

11. The method of claim 1, wherein the selecting of object data to be provided to the selected robot device, from among the classified plurality of pieces of object data, comprises selecting at least one piece of object data from among the classified plurality of pieces of object data based on performance of the selected robot device.

12. A computer program device comprising a non-transitory computer-readable recording medium having recorded thereon a program, which when executed by a computer of a robot device, causes the computer to control the robot device to perform operations comprising:
    obtaining sensing data related to objects in a certain space;
    classifying the obtained sensing data into a plurality of pieces of object data based on properties of the objects;
    selecting another robot device from among at least one other robot device;

selecting object data to be provided to the selected robot device from among the classified plurality of pieces of object data; and transmitting the selected object data to the selected robot device, wherein the classifying of the obtained sensing data into the plurality of pieces of object data comprises generating a plurality of data layers including the classified plurality of pieces of object data, wherein the classifying of the obtained sensing data into the plurality of pieces of object data comprises classifying the obtained sensing data into the plurality of pieces of object data based on types of the objects, wherein a data layer is used in generating an image layer indicating positions of objects of a particular type on a map of the certain space, and wherein the image layer indicating the positions of the objects of the particular type is displayed on a display connected to the robot device while the robot device is executing a function in a certain target area.

13. A robot device comprising:

a memory configured to store at least one instruction; and a processor configured to execute the at least one instruction to control the robot device, wherein the processor is further configured to execute the at least one instruction to control the robot device to: obtain sensing data related to objects in a certain space, classify the obtained sensing data into a plurality of pieces of object data based on properties of the objects, generate a plurality of data layers comprising the classified plurality of pieces of object data, select another robot device from among at least one other robot device, select object data to be provided to the selected robot device from among the classified plurality of pieces of object data, and transmit the selected object data to the selected robot device, wherein the processor is further configured to execute the at least one instruction to control the robot device to classify the obtained sensing data into a plurality of pieces of object data based on types of the objects, wherein a data layer is used in generating an image layer indicating positions of objects of a particular type on a map of the certain space, and wherein the image layer indicating the positions of the objects of the particular type is displayed on a display connected to the robot device while the robot device is executing a function in a certain target area.

14. The robot device of claim 13, wherein the processor is further configured to execute the at least one instruction to control the robot device to generate a data layer indicating a movable region of the robot device in the certain space based on the sensing data.

15. The robot device of claim 13, wherein the processor is further configured to execute the at least one instruction to control the robot device to select at least one piece of object data from among the plurality of pieces of object data based on a preset data transmission period.

16. The robot device of claim 13, wherein the preset data transmission period is determined based on a frequency of changes in the plurality of pieces of object data.

* * * * *